United States Patent
Tuer et al.

(10) Patent No.: US 7,477,250 B2
(45) Date of Patent: Jan. 13, 2009

(54) METHOD AND SYSTEM FOR HAPTO-VISUAL SCENE DEVELOPMENT AND DEPLOYMENT

(75) Inventors: Kevin Tuer, Stratford (CA); Grace Ni, Cambridge (CA); Kamyar Ziaei, Kitchener (CA); Jeff Smith, Waterloo (CA); Joseph Shu, Waterloo (CA); Marek Krzeminski, Waterloo (CA); Mauro Rossi, Cambridge (CA); Shan Mi, Mississauga (CA)

(73) Assignee: Handshake VR (2007) Inc., Waterloo, ON ( * ) Notice: Subject to any disclaimer, the term of this patent is extended or adjusted under 35 U.S.C. 154(b) by 447 days.

(21) Appl. No.: 11/336,809

(22) Filed: Jan. 23, 2006

(65) Prior Publication Data

US 2006/0170673 A1 Aug. 3, 2006

Related U.S. Application Data

(60) Provisional application No. 60/644,968, filed on Jan. 21, 2005.

(51) Int. Cl.
*G06T 15/00* (2006.01)
*H04J 3/00* (2006.01)
*H04N 7/00* (2006.01)
*G09G 5/00* (2006.01)

(52) U.S. Cl. ............... 345/419; 345/581; 345/619; 345/633; 715/757; 348/461; 370/471; 370/473

(58) Field of Classification Search ......... 345/581–582, 345/428, 600, 619, 632–633, 156, 166, 173–174; 715/722, 757, 773, 782, 850, 852; 382/154, 382/254, 276, 285; 348/135, 138, 461, 537; 370/349, 509, 470–473; 455/466, 91, 24, 455/130

See application file for complete search history.

(56) References Cited

U.S. PATENT DOCUMENTS 5,305,429 A 4/1994 Sato et al.
5,420,794 A 5/1995 James
5,694,013 A 12/1997 Stewart et al.

(Continued)

FOREIGN PATENT DOCUMENTS

| DE | 199 07 620 | 8/2000 |
|---|---|---|
| WO | WO 98/14886 | 4/1998 |
| WO | WO 00/50974 | 8/2000 |
| WO | WO 01/35373 | 5/2001 |
| WO | WO 02/006943 | 1/2002 |
| WO | WO 02/071322 | 9/2002 |
| WO | WO 02/102616 | 12/2002 |

OTHER PUBLICATIONS

Article entitled "A New Design Paradigm for the Rapid Development of Haptic and Telepathic Applications", written by M. Rossi, K. Tuer and D. Wang.

(Continued)

*Primary Examiner*—Wesner Sajous

(57) ABSTRACT

A method of creating a system for haptically and graphically rendering one or more scenes. The method includes generating one or more haptic targets for haptically rendering the scene as a virtual scene. The scene is haptically rendered as the virtual scene. The method also includes providing one or more graphics targets for graphically rendering the scene as a graphical scene, generating an initial data packet for the scene, and transmitting the initial data packet to the graphics target. The method also includes loading the initial data packet on the graphics target to create the graphical scene.

28 Claims, 18 Drawing Sheets

U.S. PATENT DOCUMENTS

| | | | |
|---|---|---|---|
| 5,844,392 | A | 12/1998 | Peurach et al. |
| 5,920,863 | A | 7/1999 | McKeehan et al. |
| 5,961,585 | A | 10/1999 | Hamlin |
| 6,084,587 | A * | 7/2000 | Tarr et al. ............... 345/419 |
| 6,111,577 | A | 8/2000 | Zilles et al. |
| 6,131,097 | A | 10/2000 | Peurach et al. |
| 6,144,884 | A | 11/2000 | Niemeyer et al. |
| 6,195,701 | B1 | 2/2001 | Kaiserswerth et al. |
| 6,275,773 | B1 | 8/2001 | Lemelson et al. |
| 6,374,255 | B1 * | 4/2002 | Peurach et al. ............. 707/102 |
| 6,385,638 | B1 | 5/2002 | Baker-Harvey |
| 6,421,048 | B1 | 7/2002 | Shih et al. |
| 6,438,573 | B1 | 8/2002 | Nilsen |
| 6,570,564 | B1 | 5/2003 | Sowizral et al. |
| 6,735,717 | B1 | 5/2004 | Rostowfske et al. |
| 6,839,663 | B1 | 1/2005 | Temkin et al. |
| 6,859,819 | B1 | 2/2005 | Rosenberg et al. |
| 6,901,074 | B1 | 5/2005 | Yamasaki |
| 6,924,787 | B2 | 8/2005 | Kramer et al. |
| 6,937,033 | B2 | 8/2005 | Boronkay et al. |
| 6,965,371 | B1 | 11/2005 | MacLean et al. |
| 6,968,905 | B2 | 11/2005 | Adnan et al. |
| 2005/0093874 | A1 * | 5/2005 | Levene et al. ............. 345/582 |
| 2005/0128211 | A1 * | 6/2005 | Berger et al. ............. 345/582 |
| 2005/0168476 | A1 * | 8/2005 | Levene et al. ............. 345/582 |
| 2006/0109266 | A1 * | 5/2006 | Itkowitz et al. ........... 345/419 |
| 2006/0122819 | A1 * | 6/2006 | Carmel et al. .............. 703/21 |
| 2007/0018993 | A1 * | 1/2007 | Levene et al. ............. 345/582 |
| 2007/0142751 | A1 * | 6/2007 | Kang et al. ................ 600/587 |

OTHER PUBLICATIONS

Atricle entitled "A Perceptually-Inspired Force Model for Haptic Texture Rendering", written by Miguel A. Otaduy and Ming C. Lin of the University of Noth Carolina at Chapel Hill.

Article entitled "Electrostatic Tactile Display for Presenting Surface Roughness Sensatiion", written by Yamamoto et al, University of Tokyo, p. 680.

Article entitled "Telerobotics with Large time Delays—The ROTEX Experience", Hirzinger et al., p. 571.

Article entitled "A Distributed Architecture for Multilayer Interactive Applications on the Internet", Diot et al. p. 6.

Jason P. Fritz, "Haptic Rendering Techniques for Scientific Visualization", Fall 1996.

Article entitled "Real Time Platform Middleware for Transparent Prototyping of Haptic Applications", George Pava & Karon E. MacLean, Proceedings of the 12th International Symposium on Haptic Interfaces for Virtual Environment and Teleoperator Systems (Haptics '04).

PCT/CA2006/000082, WOX, Handshake VR Inc., International Search Report.

* cited by examiner

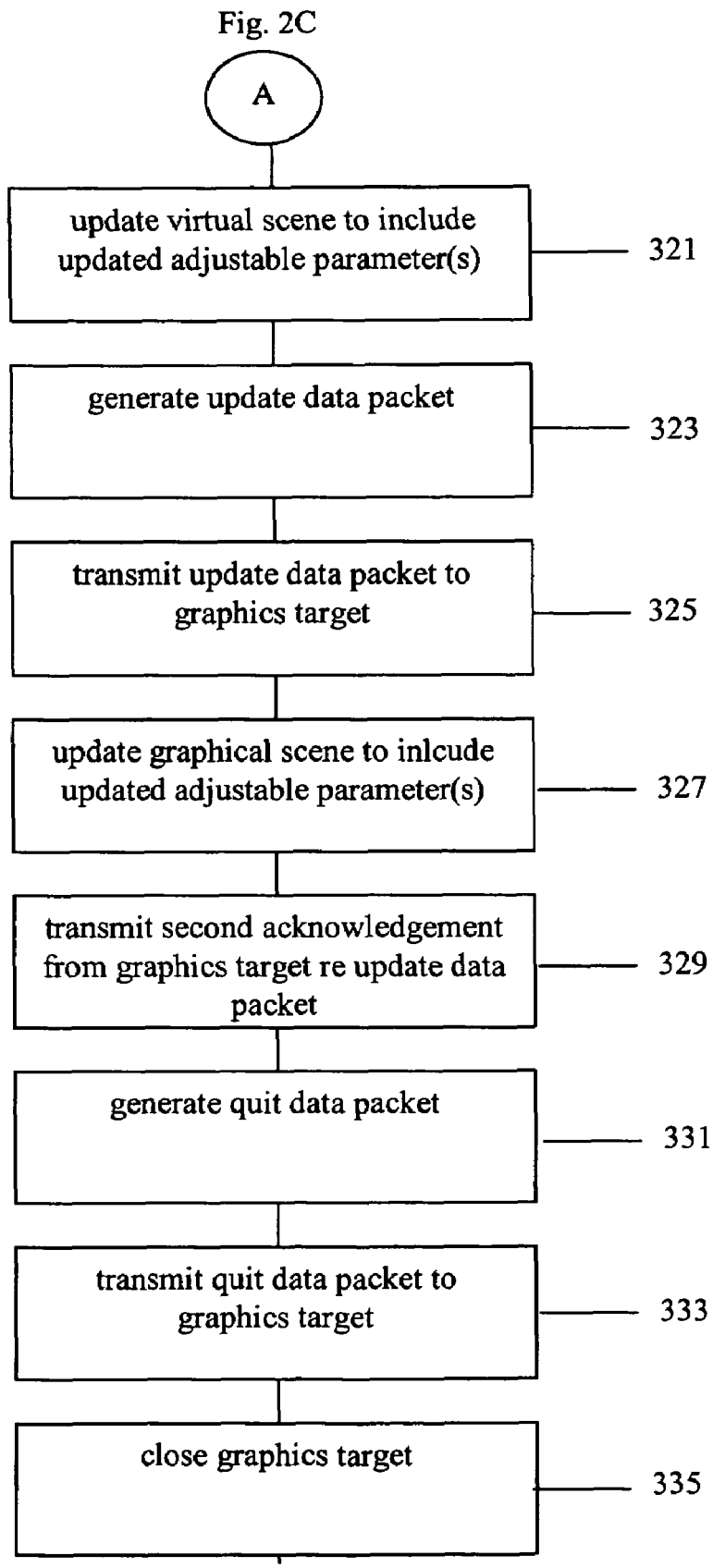

METHOD AND SYSTEM FOR HAPTO-VISUAL SCENE DEVELOPMENT AND DEPLOYMENT

This application claims the benefit of U.S. Provisional Application No. 60/644,968, filed Jan. 21, 2005.

FIELD OF THE INVENTION

This invention is related to a method and a system for haptically and graphically rendering one or more scenes.

BACKGROUND OF THE INVENTION

Three-dimensional visual scenes are, using one or more computers, rendered haptically (i.e., to provide a tactile sensation) by a scene owner and graphically (i.e., to provide a visual representation) by a scene displayer and used in a hapto-visual system in various design, testing, and other contexts. A scene typically includes one or more elements (or objects) which are to be rendered haptically and graphically. A scene may include an object which is only to be rendered haptically but not graphically, and/or there may also objects which are only graphically rendered. Due to limited processor computation capacity, complex hapto-visual systems may require the separation of scene owners and scene displayers onto different computer systems that are interconnected via a network. The scenes contain a large amount of haptic and visual information, and typically, dedicated high bandwidth networks are required to allow information to pass from the scene owner to the scene displayer.

In addition, only unidirectional communication from the scene owner to the scene displayer is permitted in the prior art. Also, the communication is typically one-to-one or one-to-many.

Accordingly, known systems which render scenes haptically and graphically suffer from a number of disadvantages.

Certain applications require real-time capabilities for certain components of a system, e.g., a haptic rendering algorithm that calculates the force to be applied, or network latency compensation. However, many haptic device manufacturers provide drivers that only support the major operating system providers, who provide non-real-time operating systems. Accordingly, in the prior art, it is generally very difficult to find driver support for a real-time operating system (RTOS).

In addition to the requirement for real-time capabilities for certain components of the system, however, other parts of the system typically act only as observatory or supervisory parts of the overall system (e.g., parameter updates). Accordingly, in the prior art systems which include haptic and graphic components, the haptic components tend to be real-time sensitive, and the graphic components do not tend to be real-time sensitive.

In the prior art, in order to try to make real-time applications to run in a non-RTOS, a significant amount of work is required. For example, a real-time kernel is installed underneath an existing non-RTOS. This allows the real-time application process to have higher priority in using the CPU than any other processes that the non-RTOS has, even the non-RTOS itself. In this approach, a real-time application is allowed to be "run" on a non-RTOS, or more accurately, to appear to do so. However, the application is not truly running on the non-RTOS, rather, it is merely going through a back-door to the real-time kernel underneath the non-RTOS. Because of this, a third party software development kit cannot be used in a real-time application, because any real-time application has to be run in a specialized environment underneath the non-RTOS. In addition, real-time kernels typically require run-time licenses from the kernel developers for each target that the application would run on, thus increasing the cost of application deployment.

There is therefore a need for method and a system that will overcome or mitigate one or more of the disadvantages of the prior art.

SUMMARY OF THE INVENTION

In its broad aspect, the invention provides a computer-usable medium having computer readable instructions stored thereon for execution by a processor to perform a method. The method includes generating one or more haptic targets for haptically rendering one scene as one or more virtual scenes, each having one or more adjustable parameters. Next, the scene is rendered as the virtual scene. Also, one or more graphics targets for graphically rendering the scene as one or more graphical scenes is provided. One or more initial data packets comprising an identifier of the virtual scene and identifying said at least one adjustable parameter is generated. Next, the initial data packet is transmitted to the graphics target. Finally, the method includes loading the initial data packet on the graphics target to create the graphical scene, which includes the adjustable parameter.

In another aspect, the method additionally includes updating the adjustable parameter to create one or more updated adjustable parameters. The updated adjustable parameter is used to update the virtual scene. Next, an update data packet comprising said at least one updated adjustable parameter is generated. Finally, the method also includes updating the graphical scene to include the updated adjustable parameter.

In another aspect, the method of the invention additionally includes using one or more soft real time processes in haptically rendering the scene, and using one or more non-real time processes in graphically rendering the scene.

In yet another aspect, the method of the invention additionally includes generating one or more quit data packets with instructions to close the graphics target. The quit data packet is transmitted to the graphics target, and the graphics target is then closed.

In another aspect, the method of the invention includes haptically rendering a plurality of scenes, each scene being discretely haptically rendered as a discrete virtual scene, and graphically rendering said plurality of scenes, each scene being discretely graphically rendered as a discrete graphical scene corresponding to each virtual scene respectively.

According to another of its aspects, the method includes updating the adjustable parameter(s) for a preselected virtual scene to create an updated adjustable parameter therefor, the preselected virtual scene having a corresponding graphical scene. Also, the method includes using the updated adjustable parameter to update the preselected virtual scene. The update data packet for the preselected virtual scene is transmitted to the graphics target, and if the preselected corresponding graphical scene is inactive, then the corresponding graphical scene is set as active. Finally, the method includes updating said corresponding graphical scene (i.e., the active scene) to include the updated adjustable parameter.

In yet another aspect, the method of the invention additionally includes, if the preselected corresponding graphical scene is already the active scene, updating the corresponding graphical scene to include the updated adjustable parameter.

In another aspect, the invention provides a computer-usable medium having computer readable instructions stored thereon for execution by a processor to perform a method which includes generating a haptic target for haptically rendering a plurality of virtual scenes respectively, and discretely haptically rendering each scene as each virtual scene. The method also includes providing a graphics target for graphically rendering each virtual scene as a corresponding graphical scene respectively. In addition, the method includes generating an initial data packet for each virtual scene respectively, each initial data packet having an identifier of each virtual scene respectively and one or more adjustable parameters in each virtual scene respectively. Also, each initial data packet is respectively transmitted to the graphics target. Finally, the method includes loading each initial data packet on the graphics target to create each corresponding graphical scene respectively, each graphical scene including the adjustable parameter respectively.

In another of its aspects, the method additionally includes, upon loading each graphical scene on the graphics target respectively, sequentially setting each graphical scene as active respectively. Each graphical scene is set as an inactive scene upon another graphical scene subsequently being set as active. Each active scene is graphically rendered discretely.

In yet another aspect, the invention includes updating the adjustable parameter for a preselected virtual scene to create the updated adjustable parameter for the preselected virtual scene, the preselected virtual scene having a corresponding graphical scene. The method also includes using the updated adjustable parameter for the preselected virtual scene to update the preselected virtual scene. Next, an update data packet having the updated adjustable parameter for updating the corresponding graphical scene is generated, and transmitted to the graphics target. Also, in the method, if the corresponding graphical scene is inactive, then the method includes setting the corresponding graphical scene as active upon receipt of the update data packet, following which, the method also includes updating corresponding graphical scene to include the updated adjustable parameter.

In yet another aspect of the invention, if the corresponding graphical scene is already the active scene, then the corresponding graphical scene is updated to include the updated adjustable parameter.

In another of its aspects, the invention provides a system for haptically and graphically rendering a plurality of scenes. The system includes a haptic target for haptically rendering the scenes discretely as virtual scenes respectively utilizing one or more soft real time processes. The system also includes a graphics target for graphically rendering the scenes discretely as graphical scenes respectively utilizing one or more non-real time processes, each graphical scene corresponding to each virtual scene respectively. The system also includes means for generating a plurality of initial data packets, each initial data packet being provided for each virtual scene respectively, each initial data packet having an identifier of each virtual scene respectively and at least one adjustable parameter in each virtual scene respectively. In addition, the system includes means for transmitting the initial data packets sequentially to the graphics target, the graphics target being adapted to load the initial data packets thereon sequentially to create each graphical scene respectively. Each graphical scene corresponds to each virtual scene respectively, and each graphical scene has the adjustable parameter for each corresponding virtual scene respectively.

In yet another of its aspects, the system includes means for updating each adjustable parameter to create at least one updated adjustable parameter for each virtual scene respectively, and means for discretely updating each virtual scene to include the updated adjustable parameter for each virtual scene respectively. Also, the system includes means for generating update data packets for each virtual scene respectively, each update data packet having one or more updated adjustable parameters for each virtual scene respectively. In addition, the system has means for transmitting each update data packet respectively to the graphics target. The system also includes means for discretely updating each graphical scene to include the updated adjustable parameter for each graphical scene corresponding to each virtual scene respectively.

In another aspect, the invention provides a computer-usable medium having computer readable instructions stored thereon for execution by a processor to perform a method including, first, using one or more haptic targets to haptically render one or more scenes as one or more virtual scenes utilizing one or more soft real time processes. The method also includes, next, generating one or more initial data packets having an identifier of the scene and one or more adjustable parameters in the virtual scene. An initial data packet for each scene is transmitted to one or more graphics targets adapted for graphically rendering the virtual scene as one or more graphical scenes. Finally, the method also includes using the graphical target to graphically render the scene as the graphical scene utilizing one or more non-real time processes. Each graphical scene includes the adjustable parameter(s) for each scene respectively.

In another of its aspects, the method of the invention additionally includes, where the adjustable parameters are to be adjusted, updating each adjustable parameter to create an updated adjustable parameter respectively. Each updated adjustable parameter is used to update each virtual scene affected thereby respectively. The method additionally includes generating one or more update data packets for each updated scene, with the updated adjustable parameter(s) for the scene(s). Next, each update data packet is transmitted to the graphics target(s). Finally, the method also includes updating the graphical scene for each updated scene to include the updated adjustable parameter.

In yet another aspect, the invention provides a computer-usable medium having computer readable instructions stored thereon for execution by a processor to perform a method including generating one or more haptic targets for haptically rendering one or more scenes as one or more virtual scenes. Each scene includes one or more adjustable parameters. The method also includes, next, haptically rendering each scene as a virtual scene respectively, the haptic rendering utilizing one or more soft real time processes. Each adjustable parameter is updated, to create one or more corresponding updated adjustable parameter. Finally, the method includes using the updated adjustable parameter to update the corresponding virtual scene.

BRIEF DESCRIPTION OF THE DRAWINGS

The invention will be better understood with reference to the drawings, in which:

FIG. 2C is a flow diagram illustrating another portion of the process of FIG. 2B;

DETAILED DESCRIPTION OF THE PREFERRED EMBODIMENT(S)

The present invention may be understood more readily by reference to the following detailed description of the invention and the examples provided herein. It is to be understood that the aspects described below are not limited to specific methods or apparatus, and as such may, of course, vary. It is also to be understood that the terminology used herein is for the purpose of the describing particular aspects only and is not intended to be limiting.

Figure 1A:
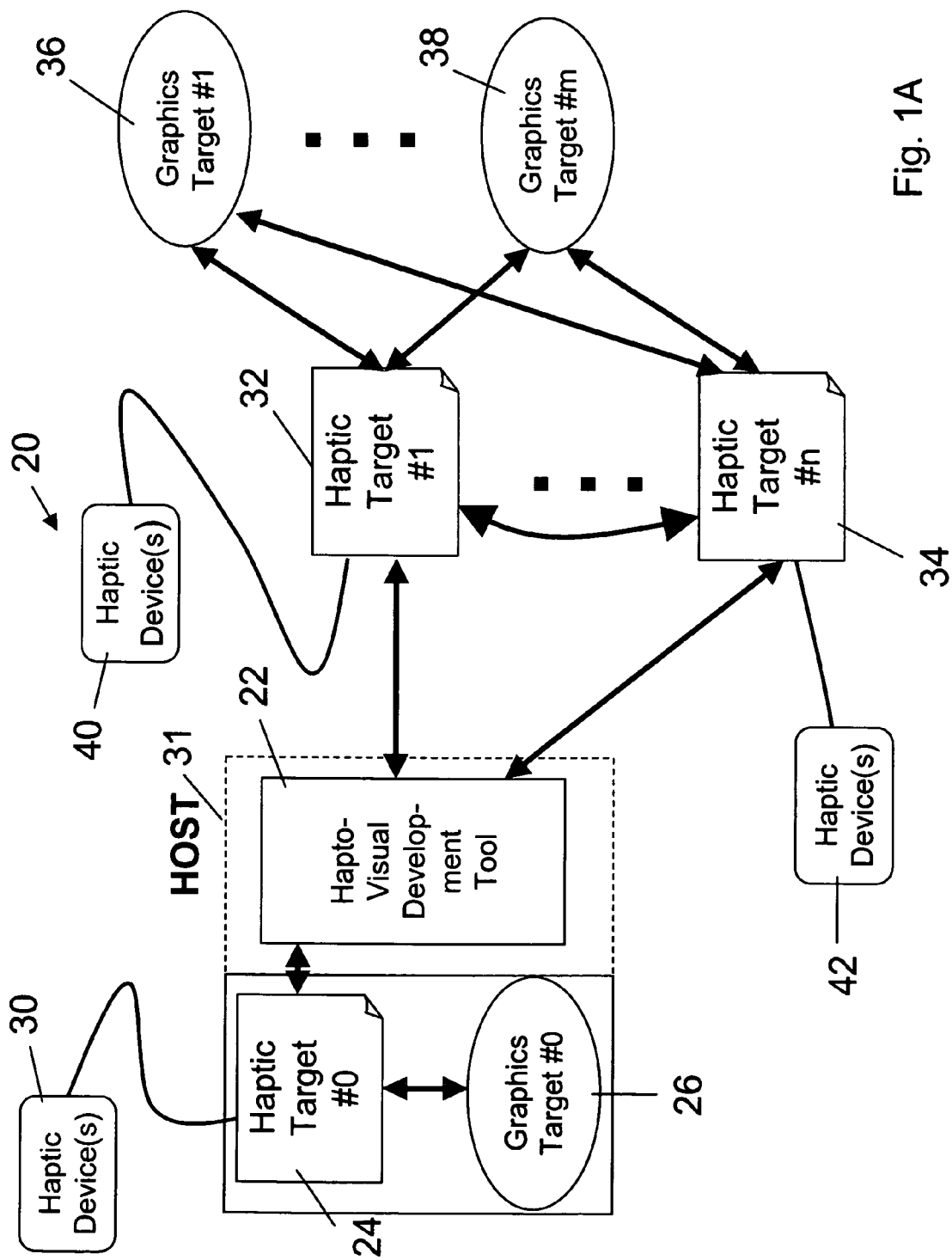
FIG. 1A is a computer system architecture diagram schematically illustrating a computer system utilized in and provided by an embodiment of the invention.
Figure 1B:
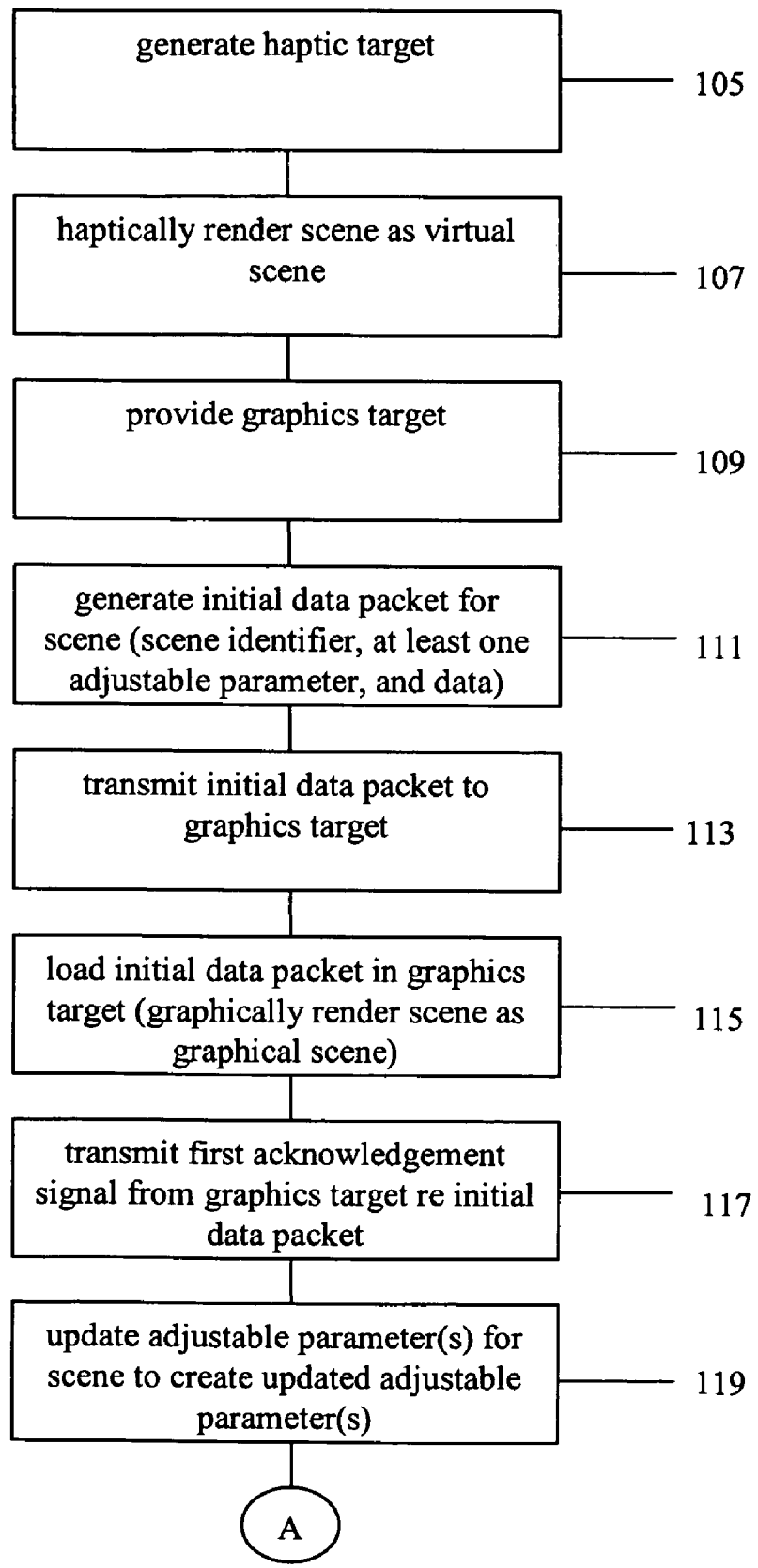
FIG. 1B is a flow diagram illustrating a portion of an embodiment of a process of the invention.
Figure 7:
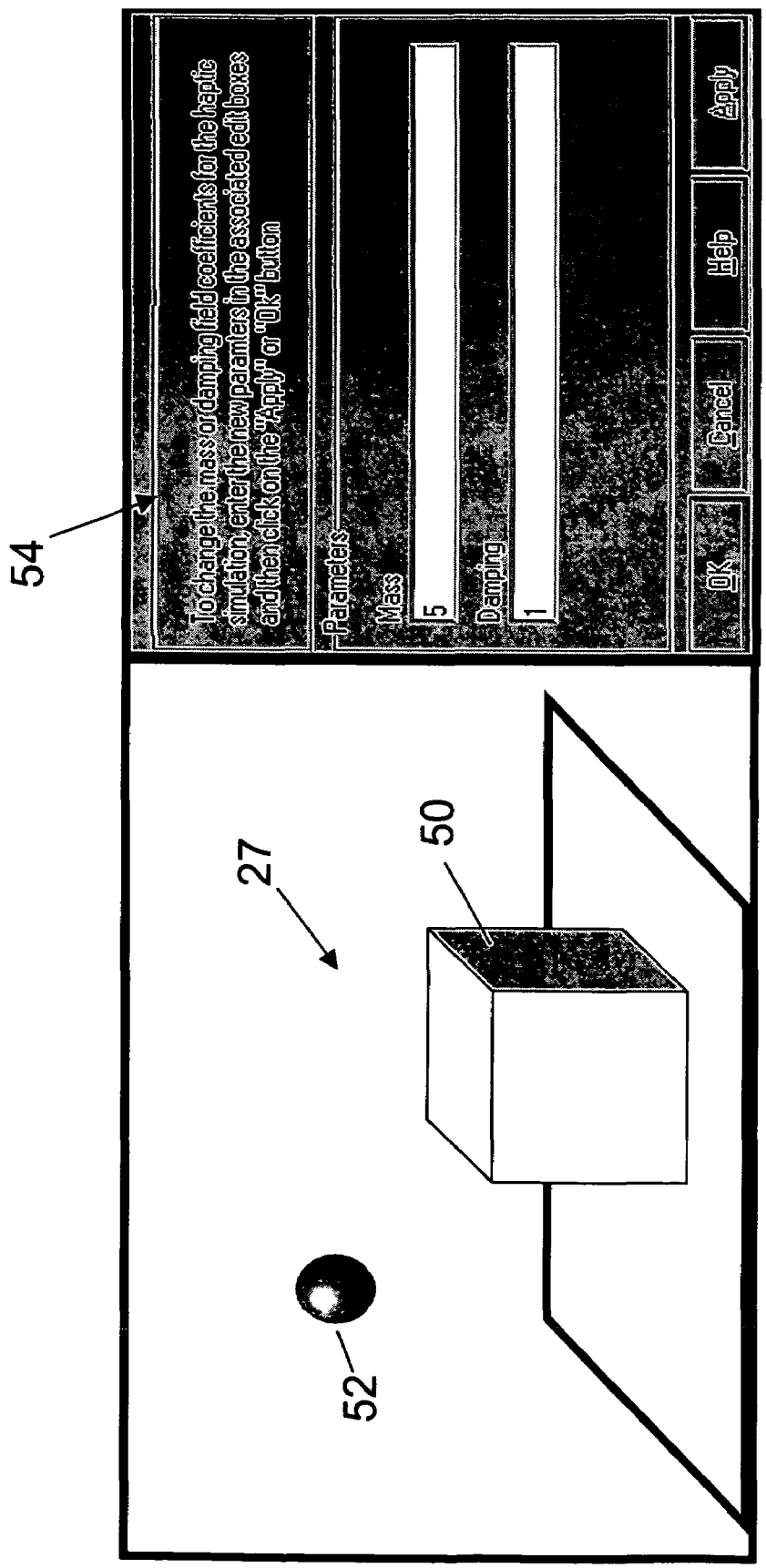
FIG. 7 is a screen diagram showing a screen display provided by a graphics target in one embodiment of the invention.

Reference is first made to FIGS. 1A and 1B to describe an embodiment of a system in accordance with the invention indicated generally by the numeral 20. The system 20 includes a hapto-visual development tool 22 for creating a hapto-visual application which generates a haptic target 24. The haptic target 24 is adapted for haptically rendering a scene (which includes one or more haptic objects) as a virtual scene. Preferably, a graphics target 26 is also provided, for graphically rendering the scene as a graphical scene 27 (as shown in FIG. 7). In one embodiment, an initial data packet 28 is generated (FIG. 13), and transmitted to the graphics target 26 (FIG. 1B). As indicated in FIG. 1B, the graphics target 26 then graphically renders the scene, to create the graphical scene 27 (FIG. 7).

The configuration shown in FIG. 1A schematically illustrates the relationships between the development tool 22 and other components of the system 20 during the development of the hapto-visual application, in a preferred development configuration. The hapto-visual development tool 22 is the environment where the logic for the application is defined and/or programmed by a user (not shown) of the development tool 22.

Figure 2A:
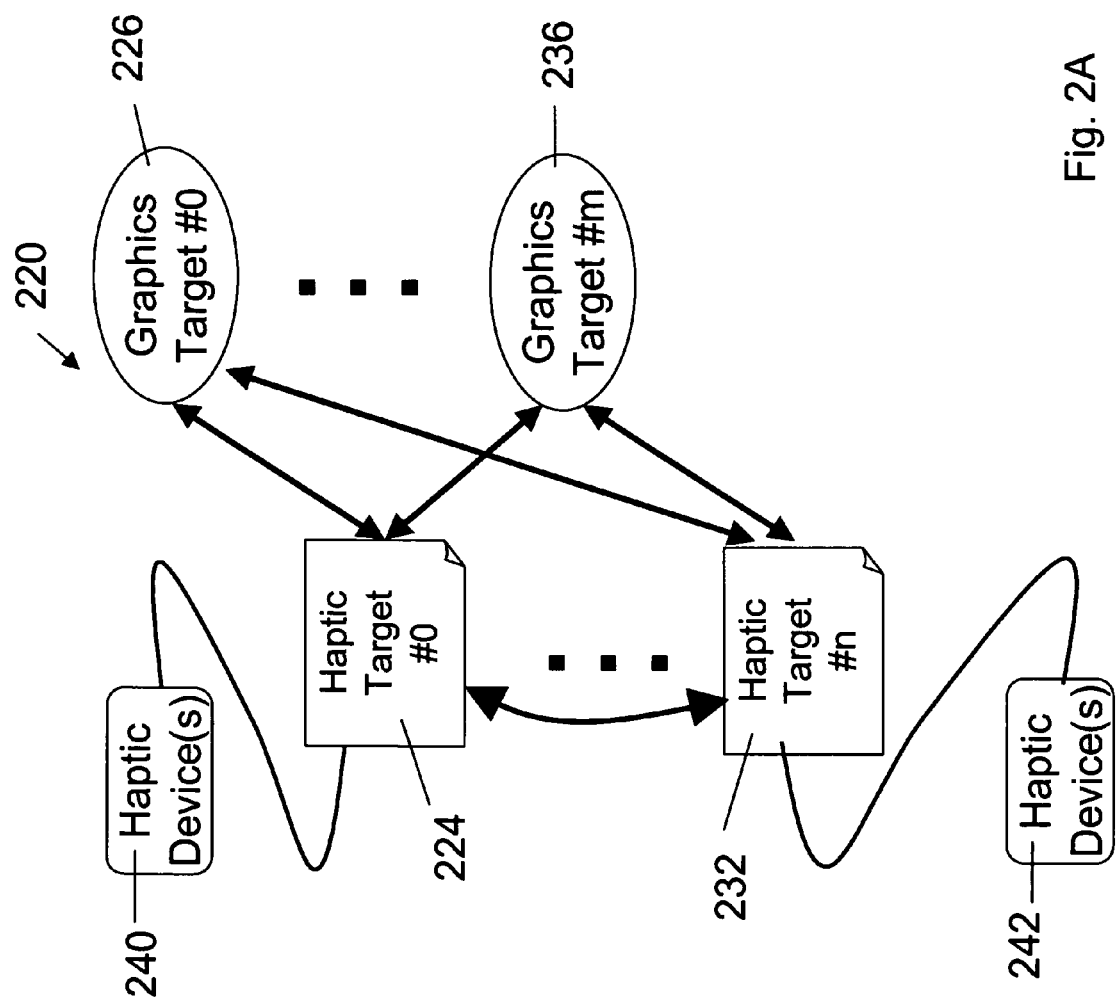
FIG. 2A is a computer system architecture diagram schematically illustrating a computer system utilized in and provided by an embodiment of the invention.
Figure 2B:
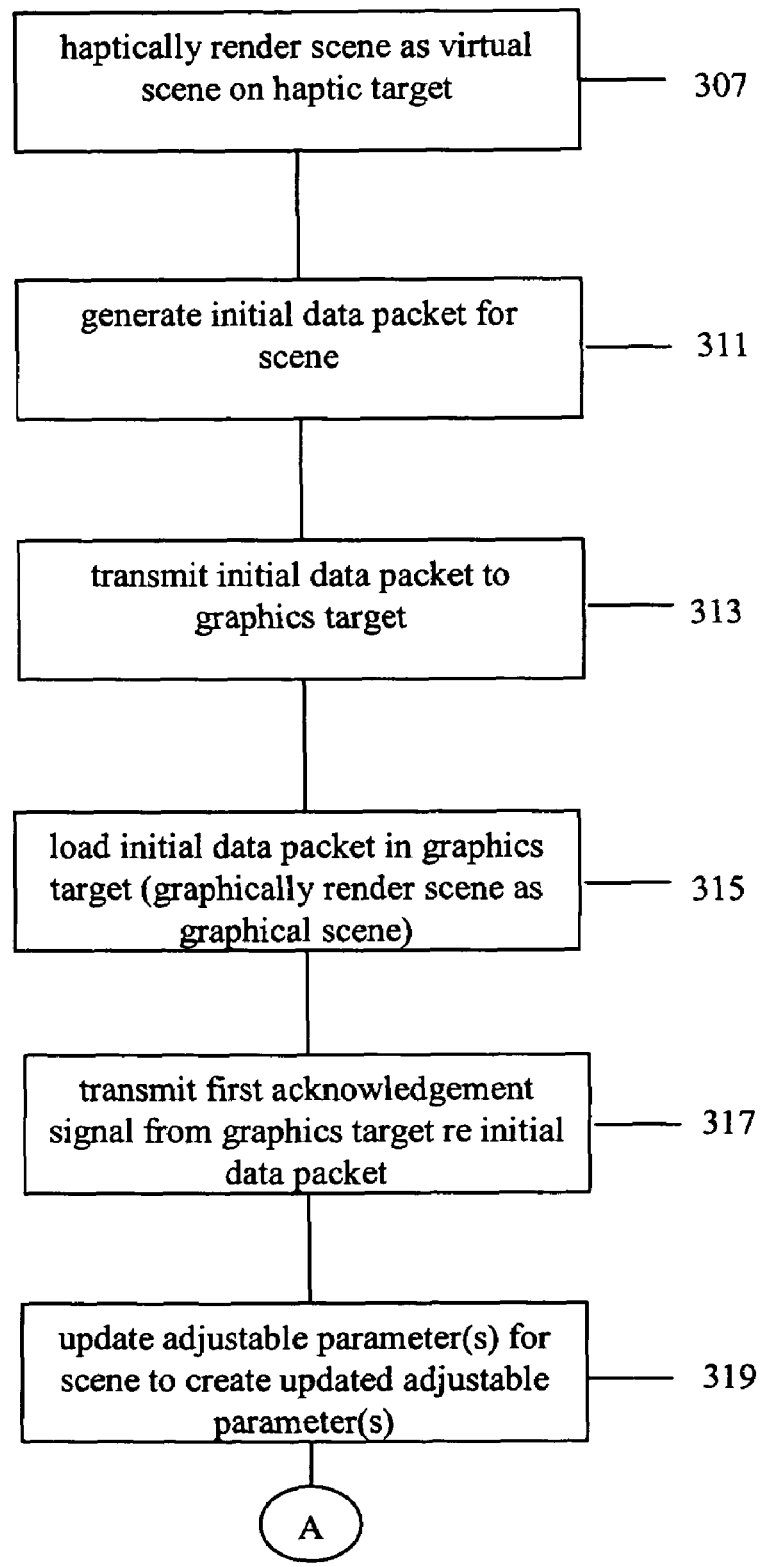
FIG. 2B is a flow diagram illustrating a portion of an embodiment of a process of the invention.

Once the hapto-visual application has been created, the development tool 22 preferably is removed, as will be described. The configuration schematically illustrated in FIG. 2A shows the application which was created as illustrated in FIG. 1A, with the hapto-visual development tool 22 removed (i.e., FIG. 2A illustrates a preferred deployment configuration, and FIG. 1A illustrates the preferred development configuration). Similarly, FIG. 2B shows the method of haptically rendering and graphically rendering one or more scenes, and updating such scenes, in the deployment configuration of the invention.

Referring again to FIG. 1A, the haptic target 24 preferably is built as a separate entity. It is also preferred that the haptic target 24 is operatively connected to one or more haptic devices 30, as will be described. Also, the haptic target 24 preferably resides on the same computer 31 as the development tool 22, but this is not necessary. For example, a second haptic target 32 generated by the development tool 22 may be moved to a different computer which is networked to the computer via a standard wired or wireless communication medium.

As can be seen in FIG. 1, the graphics target 26 is adapted for communication with the development tool 22 or the haptic target 24. The graphics target 26 can also run on a separate networked computer, if desired.

The system 20 can comprise a plurality of haptic targets and graphics targets. For example, as illustrated in FIG. 1A, the system 20 comprises haptic targets 24, 32, 34 and graphics targets 26, 36, and 38. As shown in FIG. 1A, in the preferred embodiment, the haptic targets 32, 34 also have haptic device(s) 40, 42 operatively connected thereto. The haptic targets are connected for communication with either or both the graphics targets and the development tool. For convenience, FIG. 1A does not show all the possible communication paths from the haptic targets and the graphics targets to the other haptic and graphics targets.

As will be understood by those skilled in the art, the haptic device(s) 40, 42 are for interfacing with a user (not shown) in real space. The haptic targets preferably are operatively connected to haptic devices. In the development of most hapto-visual applications, a haptic device is needed to assist in adjusting parameters and otherwise to develop the applications. Although a hapto-visual application could, in theory, be developed in the absence of a haptic device, these situations are rare. In most cases, development in the absence of a haptic device would probably not be feasible.

FIG. 1B is a flow chart of a method of creating the hapto-visual application according to one embodiment of the invention. It will be understood that the hapto-visual application is adapted for haptically and graphically rendering a plurality of scenes. However, for clarity, FIG. 1B refers to rendering only one scene, and also refers to only one haptic and graphics target each. The method begins at block 105 where the development tool 22 generates the haptic target 24. The method proceeds to block 107, where the haptic target 24 haptically renders a scene as the virtual scene. It will be understood that the scene includes one or more adjustable parameters. In block 109, the development tool provides the graphics target 26. The graphics target 26 is started (or provided) by the development tool 22. It will be evident to those skilled in the art that, in general, the sequence in which haptic targets are generated and graphics targets are provided is not particularly important—i.e., graphics targets may be provided prior to the generation of haptic targets, and vice versa.

In block 111, the initial data packet 28 for a particular scene is generated. The initial data packet 28 is transmitted to the graphics target 26, in block 113. The initial data packet 28 includes a scene identifier (i.e., to identify the particular scene), an identification of one or more adjustable parameters, and the data required for graphically rendering the scene (FIG. 1B). The initial data packet 28 is next loaded in the graphics target 26—i.e., the graphics target graphically renders the scene as a graphical scene (block 115).

Preferably, and as can be seen in block 117, a first acknowledgement signal is transmitted from the graphics target 26 in respect of the initial data packet 28, to confirm receipt of the initial data packet 28. Next, if desired, the adjustable parameter(s) for a particular scene is (are) updated to create updated adjustable parameter(s), as shown in block 119.

Figure 1C:
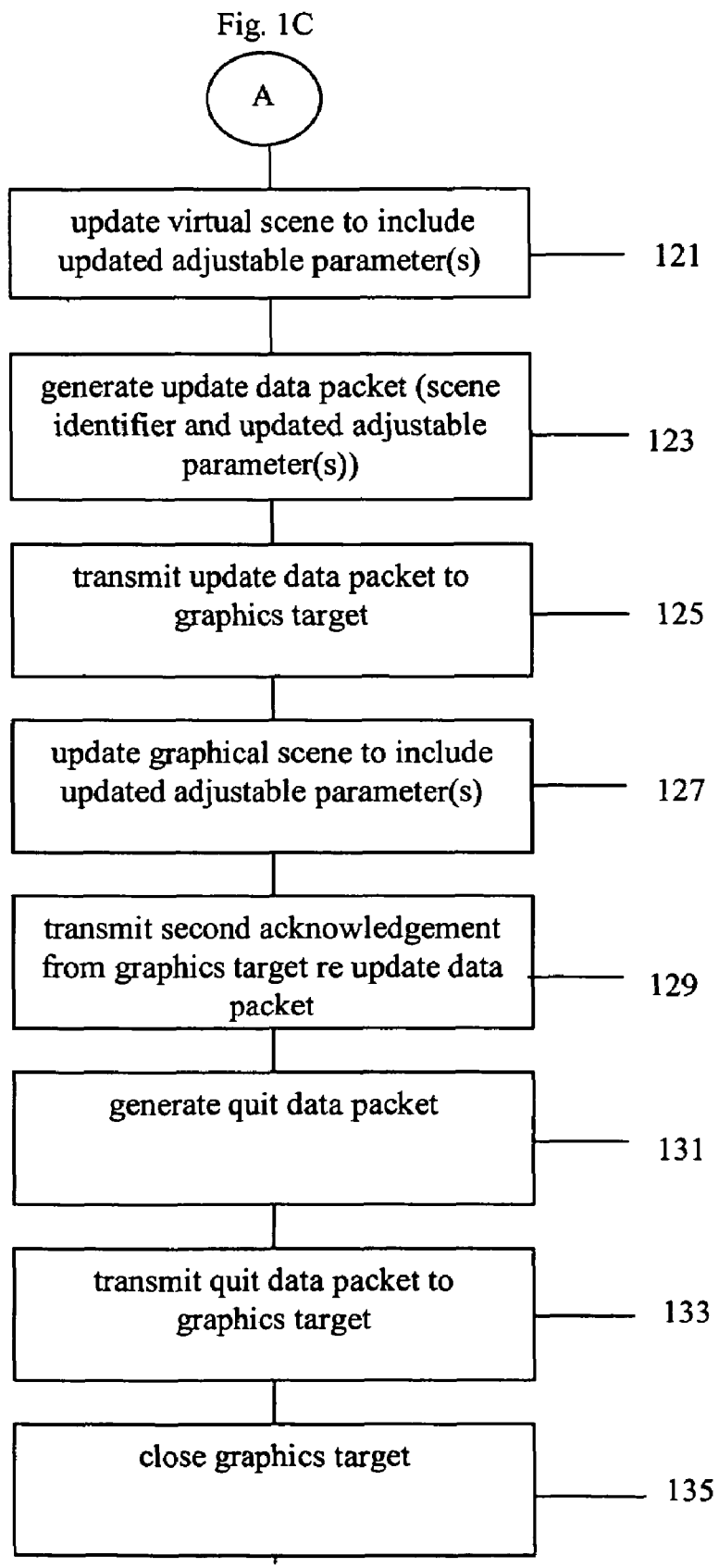
FIG. 1C is a flow diagram illustrating another portion of the process of FIG. 1B.

Next, the relevant virtual scene is updated to include the updated adjustable parameter(s), as set out in block 121 in FIG. 1C. An update data packet 44 (FIG. 13) is then generated (as shown in block 123), which includes the scene identifier and also the updated adjustable parameter(s). The update data packet 44 is transmitted to the graphics target 26, as shown in block 125. At the graphics target 26, the relevant graphical scene 27 is updated to include the updated adjustable parameter(s) (block 127). Preferably, a second acknowledgement is transmitted from the graphics target 26, to acknowledge receipt of the update data packet (block 129).

When the graphics target 26 is to be closed, as shown in block 131, a quit data packet 46 (FIG. 13) is generated. The quit data packet 46 is transmitted to the graphics target 26 (block 133). The graphics target 26 is then closed (block 135).

Referring again to FIG. 1A, the invention provides for bidirectional transmission of information between haptic targets 24, 32, 34 (i.e. the scene owner/maintainer in each case, for a particular scene) to the graphics targets 26, 36, 38 (i.e. the scene displayer/renderer in each case) over any standard wired or wireless communication medium (e.g., Ethernet UDP communications) in real-time. This is in contrast to existing graphics communication networks for hapto-graphic applications of the prior art, which provide a unidirectional one-to-one or a one-to-many relationship from the scene owner to the scene displayer. The invention allows for the aforementioned relationships plus adds the many-to-one and many-to-many relationship possibilities. The addition of these two new relationships between the scene owner and displayer allow for bidirectional communication to be developed.

FIG. 2A schematically illustrates an embodiment of a hapto-visual system 220 of the invention, i.e., after development of the system 220. FIG. 2A illustrates a preferred deployment configuration. Because the system 220 has been developed, the development tool is no longer included in the system 220. It will be understood that the system 220 can include many haptic targets (with many haptic devices attached thereto), and many graphics targets. For the purposes of illustration, the system 220 includes haptic targets 224, 232 with haptic devices 240, 242 operatively connected therewith and graphics targets 226, 236. As is represented schematically, the haptic and graphics targets are adapted for bidirectional communication with each other over a standard wired or wireless communication medium.

As shown in FIG. 2B, in the system 220, an embodiment of the method of the invention is performable which corresponds to part of the method illustrated in FIG. 1B. It will be understood that the hapto-visual system 220 is adapted for haptically and graphically rendering a plurality of scenes. However, for clarity, FIG. 2B refers to rendering only one scene, and also refers to only one haptic and graphics target each. The method begins at 307, where the haptic target 224 haptically renders a scene as the virtual scene. It will be understood that the scene includes one or more adjustable parameters.

In block 311, the initial data packet 28 for a particular scene is generated. The initial data packet 28 is transmitted to the graphics target 226, in block 313. The initial data packet 28 includes a scene identifier (i.e., to identify the particular scene), an identification of one or more adjustable parameters, and the data required for graphically rendering the scene (FIG. 2B). The initial data packet 28 is next loaded in the graphics target 226—i.e., the graphics target graphically renders the scene as a graphical scene (block 315).

Preferably, and as can be seen in block 317, a first acknowledgement signal is transmitted from the graphics target 226 in respect of the initial data packet 28, to confirm receipt of the initial data packet 28. Next, if desired, the adjustable parameter(s) for a particular scene is (are) updated to create updated adjustable parameter(s), as shown in block 319.

Next, the relevant virtual scene is updated to include the updated adjustable parameter(s), as set out in block 321 in FIG. 2C. An update data packet 44 (FIG. 13) is then generated (as illustrated in block 323), which includes the scene identifier and also the updated adjustable parameter(s). The update data packet 44 is transmitted to the graphics target 226, as shown in block 325. At the graphics target 226, the relevant graphical scene 27 is updated to include the updated adjustable parameter(s) (block 327). Preferably, a second acknowledgement is transmitted from the graphics target 226, to acknowledge receipt of the update data packet (block 329).

When the graphics target 226 is to be closed, as shown in block 331, a quit data packet 46 (FIG. 13) is generated. The quit data packet 46 is transmitted to the graphics target 226 (block 333). The graphics target 226 is then closed (block 135).

Additional embodiments of the invention are shown in FIGS. 3-6 and 8-13. In FIGS. 3-6 and 8-13, elements are numbered so as to correspond to like elements shown in FIGS. 1A, 1B, 1C, 2A, 2B, 2C, and 7.

Figure 3:
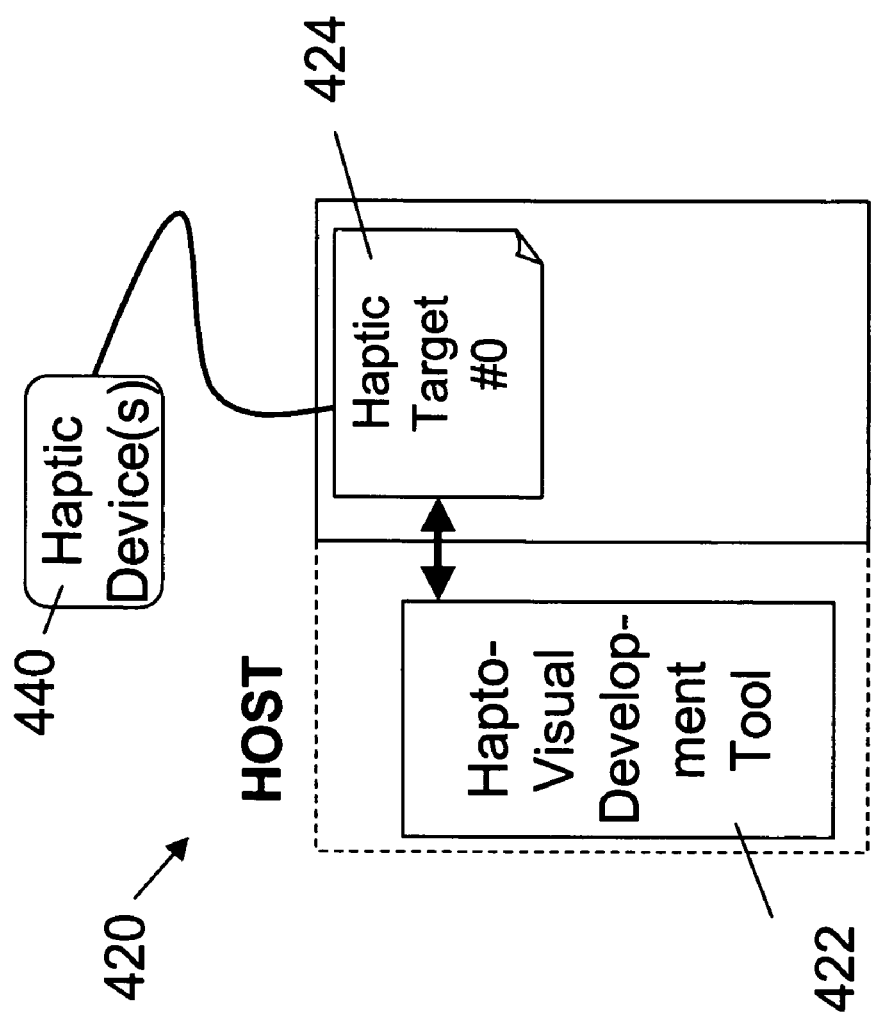
FIG. 3 is a computer system architecture diagram schematically illustrating a computer system utilized in and provided by an embodiment of the invention.
Figure 4:
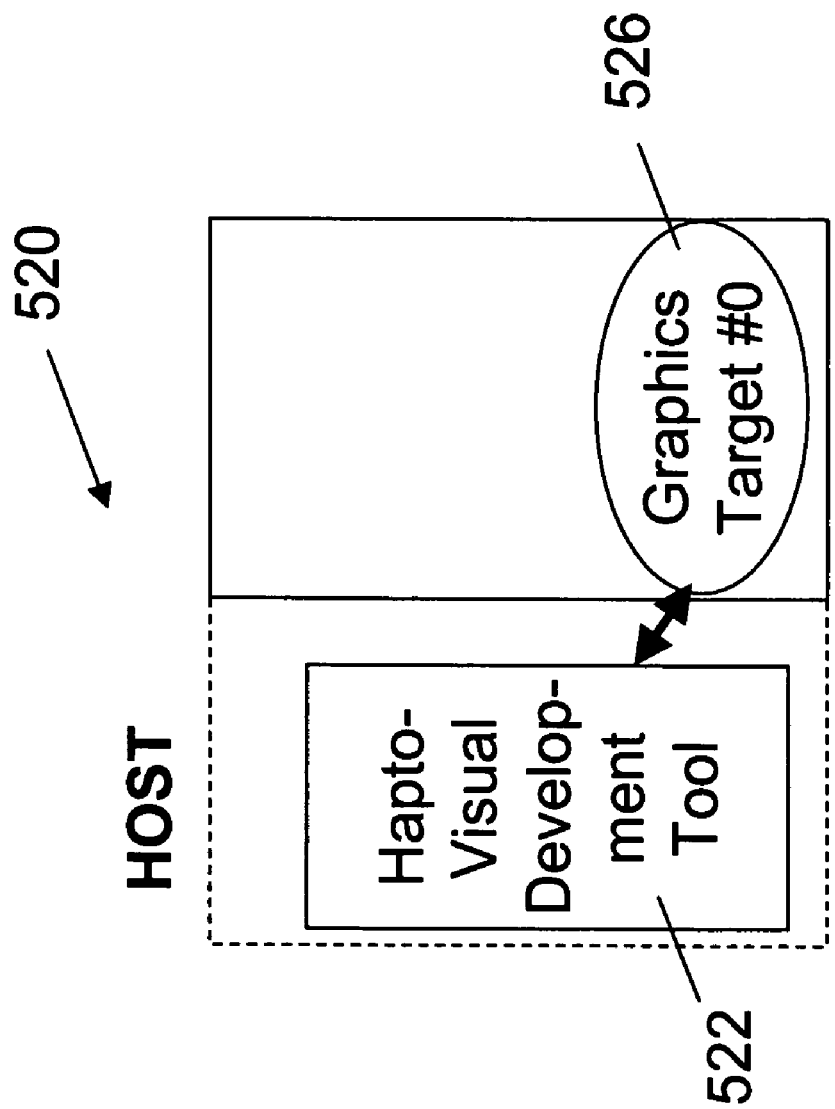
FIG. 4 is a computer system architecture diagram schematically illustrating a computer system utilized in and provided by an embodiment of the invention.
Figure 5:
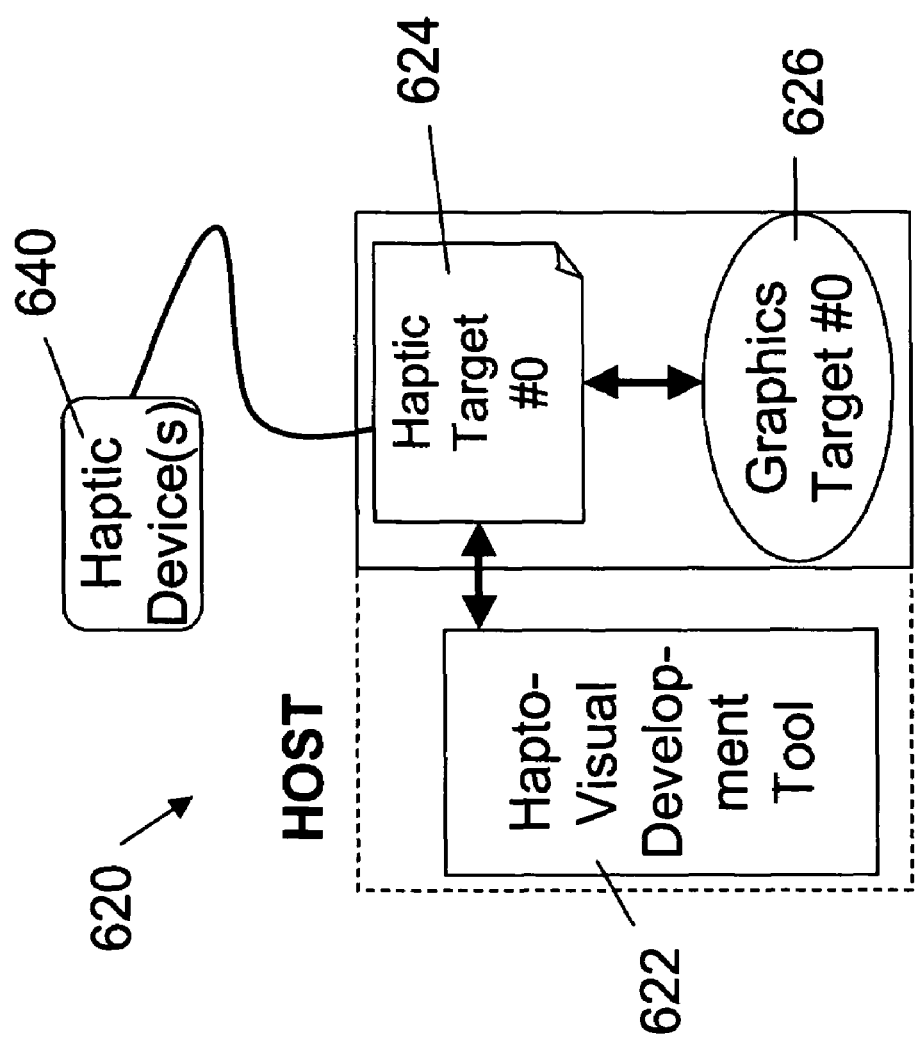
FIG. 5 is a computer system architecture diagram schematically illustrating a computer system utilized in and provided by an embodiment of the invention.

FIGS. 3-5 show configurations which may be used, for example, where a relatively large-scale application is being developed. FIG. 3 shows a system 420 of the invention which includes only a development tool 422 and a haptic target 424, with a haptic device 440 operatively connected therewith. This embodiment does not include a graphics target. This configuration may be used, for example, where the user is working on developing only one (or more) haptic target(s), and others are developing the graphics target(s) separately.

FIG. 4 discloses a system 520 which includes only a development tool 522 and graphics target 526. This configuration may be used, for example, where the user is developing the graphics target(s) separately from the development of the haptic target(s).

In another embodiment, illustrated in FIG. 5, a system 620 of the invention includes a development tool 622, a single haptic target 624 and a single graphics target 626. The system 620 also includes a haptic device 640 operatively connected to the haptic target 624. This configuration may be used, for example, in large-scale application development, after separate development of the haptic target(s) and the graphics target(s) has proceeded to the point where the graphics target(s) and the haptic target(s) of the system 620 are to be put together, to result in the system 620.

Figure 6:
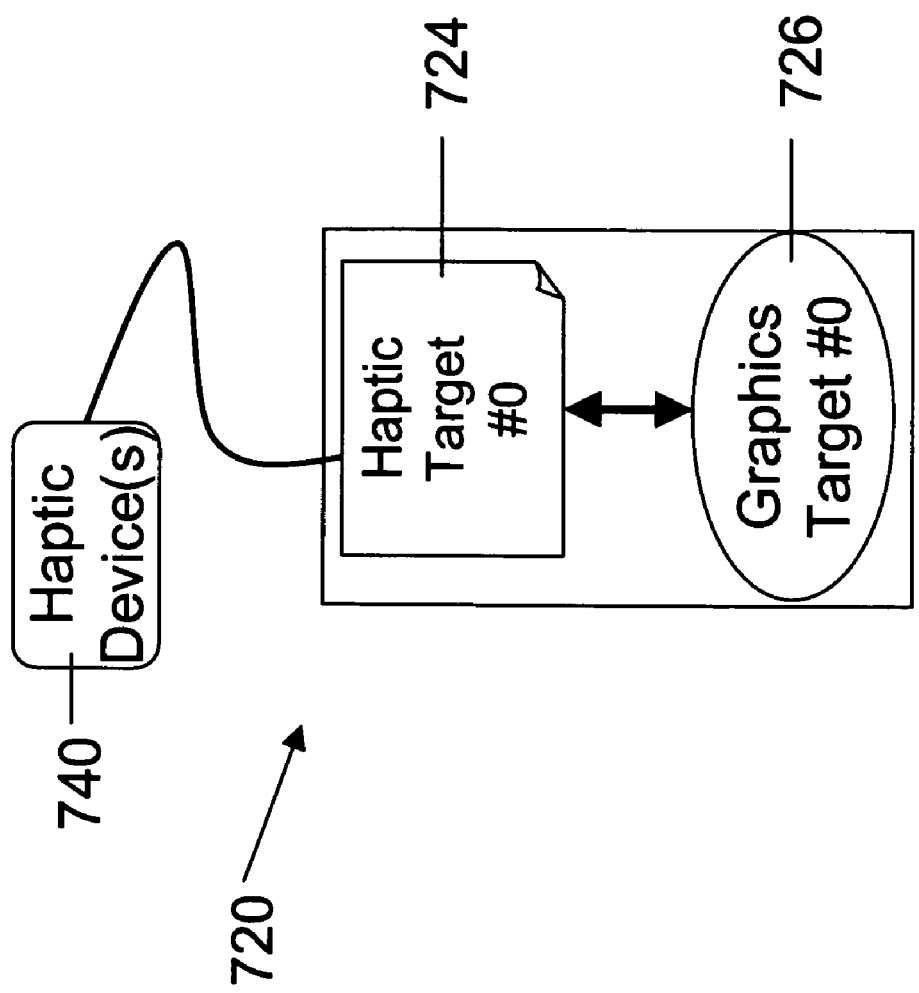
FIG. 6 is a computer system architecture diagram schematically illustrating a computer system utilized in and provided by an embodiment of the invention.

FIG. 6 illustrates another embodiment of the system 720, which is an example of the system after development thereof has been completed, and the development tool has been removed—i.e., FIG. 6 illustrates another possible deployment configuration. The system 720 includes a haptic target 724 and a graphics target 726. Preferably, a haptic device 740 is operatively connected with the haptic target 724.

It will be understood that the development tool 22 can be stored on a computer-usable medium for execution by a processor, to perform the method of the invention. The computer-usable medium could be any suitable medium, for example, the tool may simply be stored on a computer's memory and downloaded, or it may be stored on a cd-rom or any other suitable medium, as would be appreciated by those skilled in the art. Similarly, once created, the hapto-visual application created by the development tool 22 is preferably stored on any suitable computer-usable medium.

Figure 10:
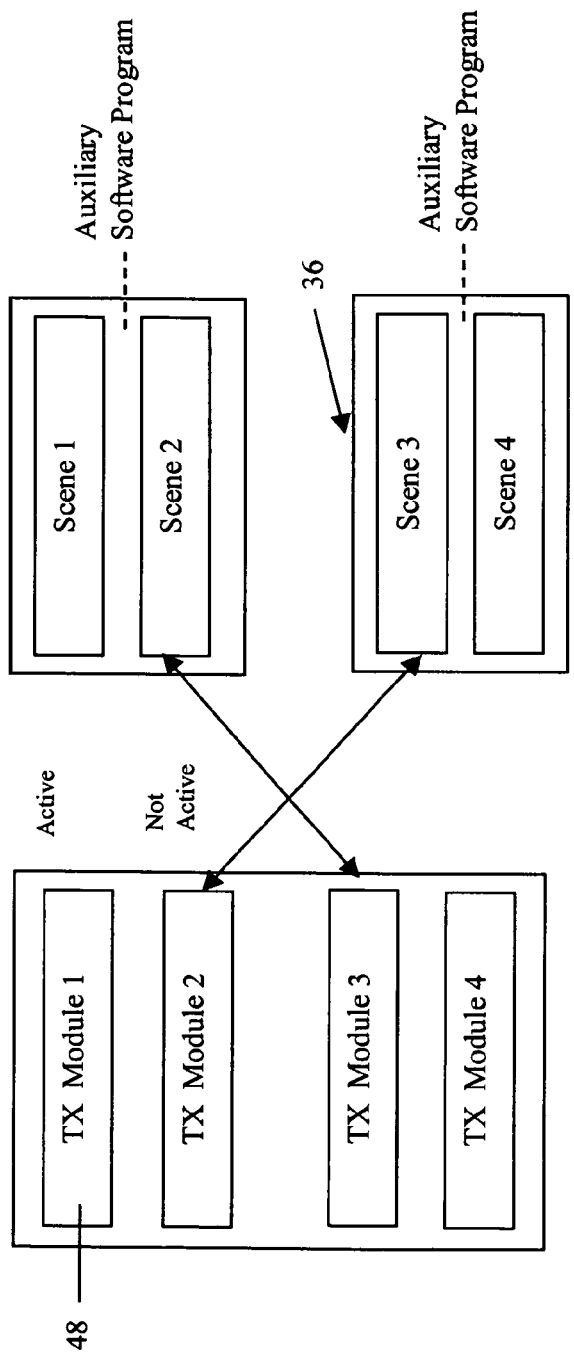
FIG. 10 is a functional block diagram schematically representing an embodiment of the invention.
Figure 11:
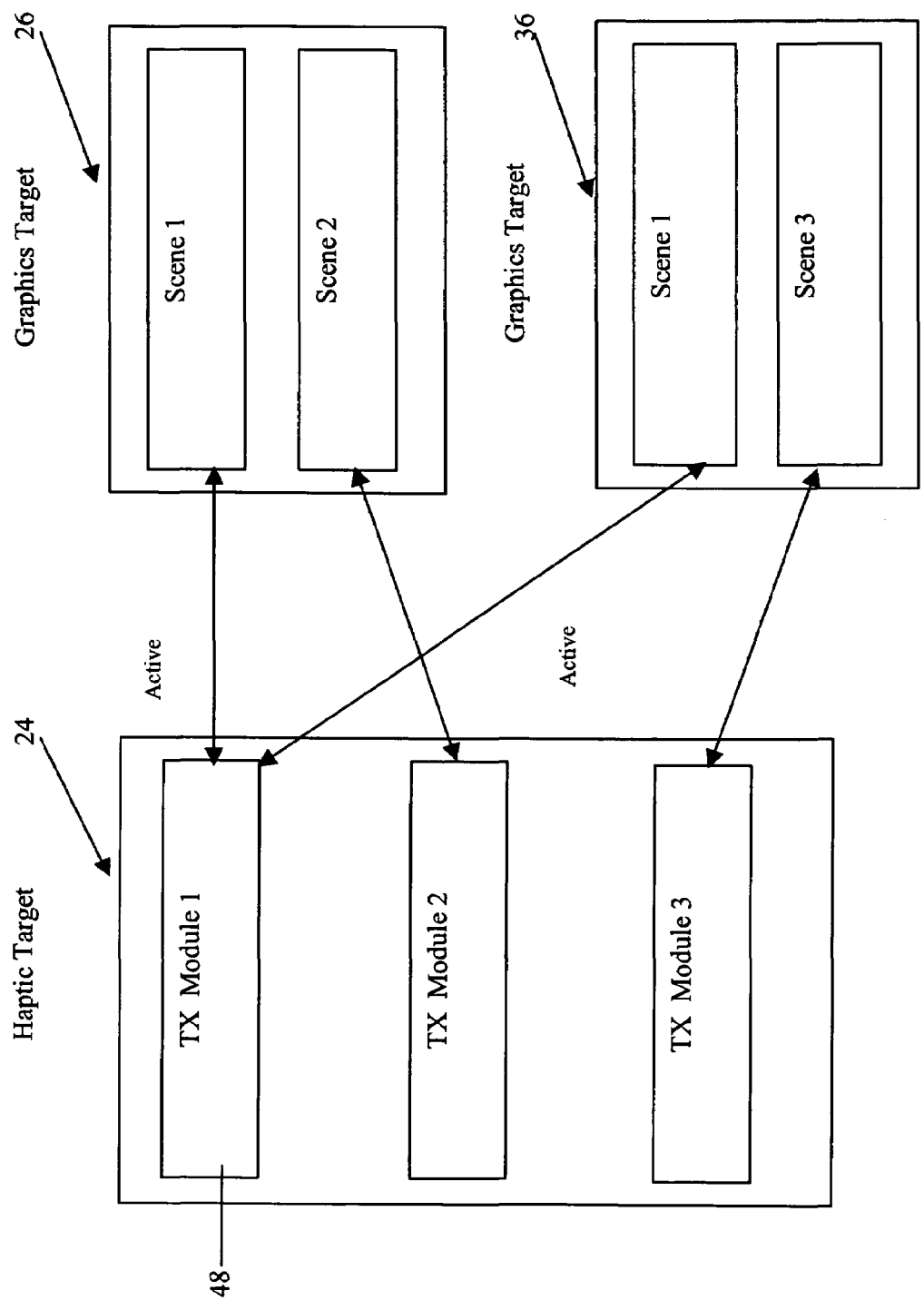
FIG. 11 is a functional block diagram schematically representing another embodiment of the invention.
Figure 12:
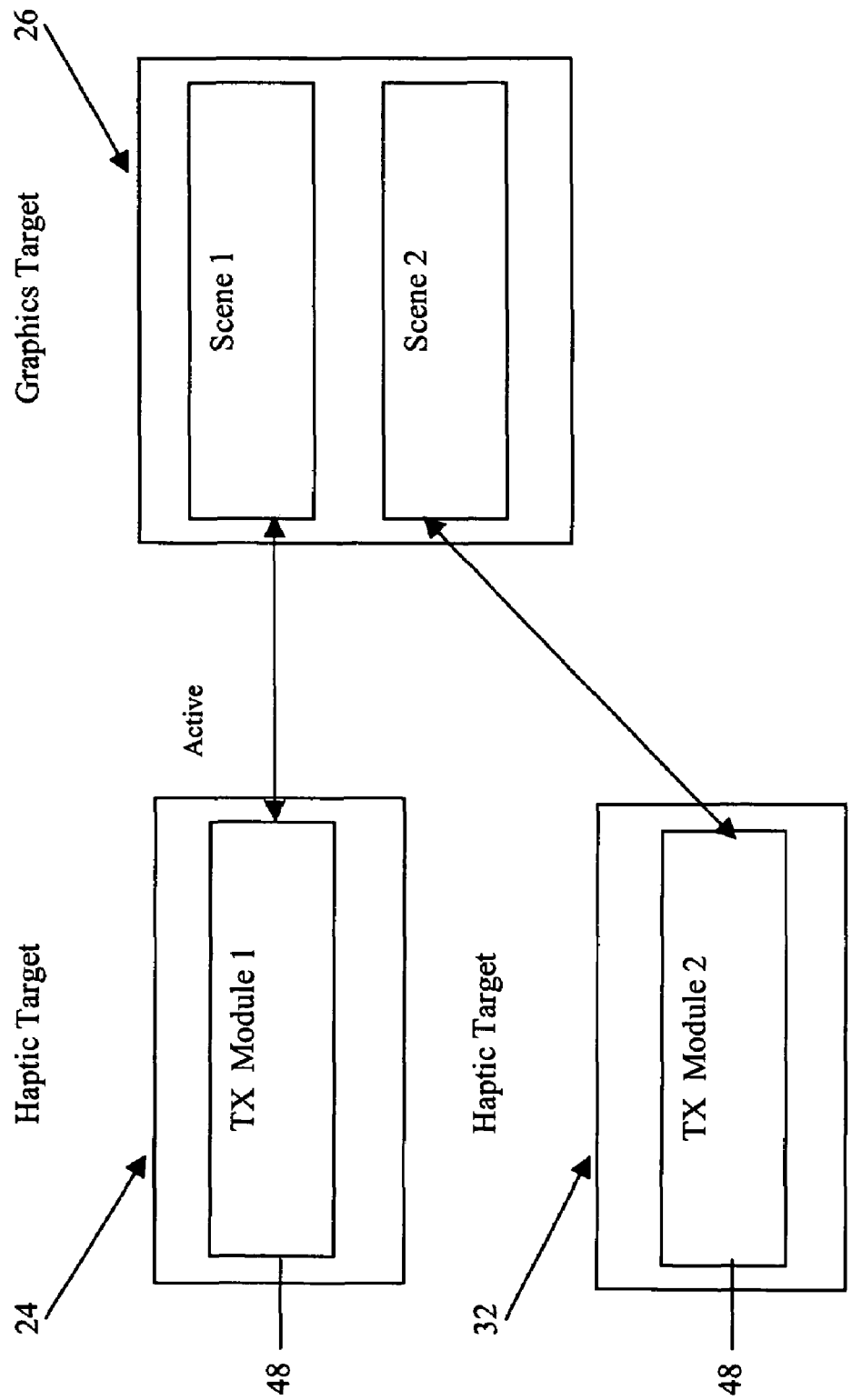
FIG. 12 is a functional block diagram schematically representing another embodiment of the invention.

The technology of the invention is generally based on a custom data packet. Preferably, the invention includes one or more transmission modules 48 (FIGS. 10-12). (For simplicity, the following discussion regarding FIGS. 10-12 is limited to a small number of haptic and graphics targets. It will be understood that the systems disclosed in FIGS. 10-12 could include pluralities of haptic and graphics targets.) The transmission module 48 used to communicate with the graphics target 26 is embedded into the haptic target 24 by including a block/module in the development tool 22 that the user of the tool 22 can include into any desired application.

FIG. 10 is a functional block diagram schematically illustrating a configuration in which the haptic target 24 and graphics targets 26, 36 are adapted for communication with each other regarding a plurality of scenes. As illustrated, a plurality of transmission modules 48 reside on the haptic target 24, and the scenes are graphically rendered on the graphics targets 26, 36, two scenes on one graphics target, and the other two on the other graphics target.

FIG. 11 shows that the same scene may be rendered graphically at two graphics targets 26, 36. The transmission module transmits data packets to the graphics targets 26, 36. If the scene (identified as "scene 1") is "inactive", it is made "active" upon receipt of the data packets at the graphics targets 26, 26. The data packets are then loaded at the graphics targets 26, 36 respectively.

In FIG. 12, two haptic targets 24, 32 are adapted for communication with the graphics target 26. Only one scene is active at any given time. Accordingly, as illustrated, the scene which is designated "scene 1" is active, and the scene which is designated "scene 2" is inactive.

The haptic target 24 is responsible for maintaining control over the 3D scene being rendered on the graphics target 26. Any changes to objects in the scene occur through the haptic target. The graphics target is responsible for visually displaying the 3D scene. The graphics target can request to make changes in the scene. All requests from the graphics target are submitted back to the haptic target for it to make the changes to the scene.

The number of transmission modules/blocks used in a single application is not limited to one. Multiple instances of the transmission block/module can reside on the haptic target which allows that one haptic target to communicate with multiple graphic targets (FIGS. 10-12).

Moreover, a single graphics target can manage multiple scenes, as shown in FIGS. 10 and 11. This is accomplished by having multiple instances of the transmission block/module in the haptic engine that all point to a single graphics target (FIG. 10). Each transmission block/module contains the information for a single scene. Only one transmission block/module can be active at one time since the graphics target will only render one 3D scene, namely the active scene. The user should define logic to ensure that only one scene is active, but if the user fails to do so, the graphics target chooses one scene and provides a warning to indicate that multiple scenes have been selected.

In the development configuration (i.e., in which the system includes the development tool, as shown in FIGS. 1A, 3, 4, and 5), the haptic target needs to be re-built every time a structural change (i.e., a change involving more than adjustable parameter updates) is made to the user's application. In contrast, the graphics target is an auxiliary software program that is an executable which operates based on information which it receives via a communication channel. Multiple instances of the auxiliary software program can be spawned on a single computer allowing for one-to-one, one-to-many, many-to-one or many-to-many communication paths to be formed between the haptic targets and graphics targets. In addition, the communication is not restricted to be between one haptic and one graphics target. Multiple haptic targets can transmit information to one graphics target or visa versa. One haptic target can transmit information to multiple graphics targets. The haptic and graphics targets can also reside on the same computer.

The invention can be applied to various applications including, but not limited to, remote monitoring and control, online computer games, simulation visualization, broadcast media events and 3D CAD modelling.

In the prior art, the capability to form graphical communication networks between one scene owner and one scene displayer or between one scene owner and many scene displayers. However, the invention adds the capability to connect many scene owners to one scene displayer or many scene owners to many scene displayers. The invention also allows the scene displayer(s) to seamlessly communicate back to the scene owner(s) which is something that is not possible within the prior art.

As described above, in the invention herein, communication between multiple scene owners and one or more displayer(s) is possible. Each displayer also has the ability to send data back to the scene owner. This facilitates interaction with the user, both in the development configuration and in the deployment configuration. As indicated above, the data sent to the scene owner (i.e., the haptic target) by the displayer (i.e., the graphics target) may result in a corresponding change to a scene. In effect, the displayer, by sending the data, requests the change. The owner makes the requested change to the scene if it is a change to an adjustable parameter and is otherwise acceptable. Subsequently, an update data packet is sent to the displayer by the owner, so that the displayer can load the update data packet and include the updated adjustable parameter in the graphically rendered scene.

The custom data packet allows new scene owners to be added relatively easily to an existing system. If scene owners are removed, the scene displayers continue to communicate with the remaining scene owners. In particular, the invention provides the ability to view and request changes to objects in a 3D scene from a remote (i.e., physically remote) location.

The current embodiment of the transmission module software is built into the haptic targets and the development tool. If the haptic targets are built using the development tool, then the appropriate transmission code is also built into the targets. However, if the user chooses not to build one or more haptic targets, then the transmission code remaining on the development tool can communicate directly to the graphics target (FIG. 4).

As indicated above, multiple blocks (i.e., transmission modules) can be used to create many-to-one or many-to-many network relationships between the haptic target(s) and graphic target(s) (FIGS. 10-12). When the haptic target starts, each haptic target sends a unique identifier to its graphics target using the custom data packet, e.g., over UDP. As indicated above, once the graphics target receives the data packet, it responds back to the haptic target to indicate that it is present and that the communication has been received successfully. The graphics target communicates to the haptic target using a second custom data packet (e.g., over UDP) as well.

During the initial communication between the haptic and graphics targets, the haptic target notifies the graphic target which 3D scene it will be referring to during the following communication, as well as which parameters in the 3D scene may be adjusted. Preferably, all 3D scenes are encapsulated in a VRML file. Adjustable parameters within a scene include, but are not limited to, size scaling, orientation change, position change, lights turned on/off, colour change, texture mapping change, transparency change, camera viewpoint change.

While the haptic target is running, any time that there is a change to be made in the 3D scene, it will send all the changed parameters using the custom data packet to the graphics target.

Figure 13:
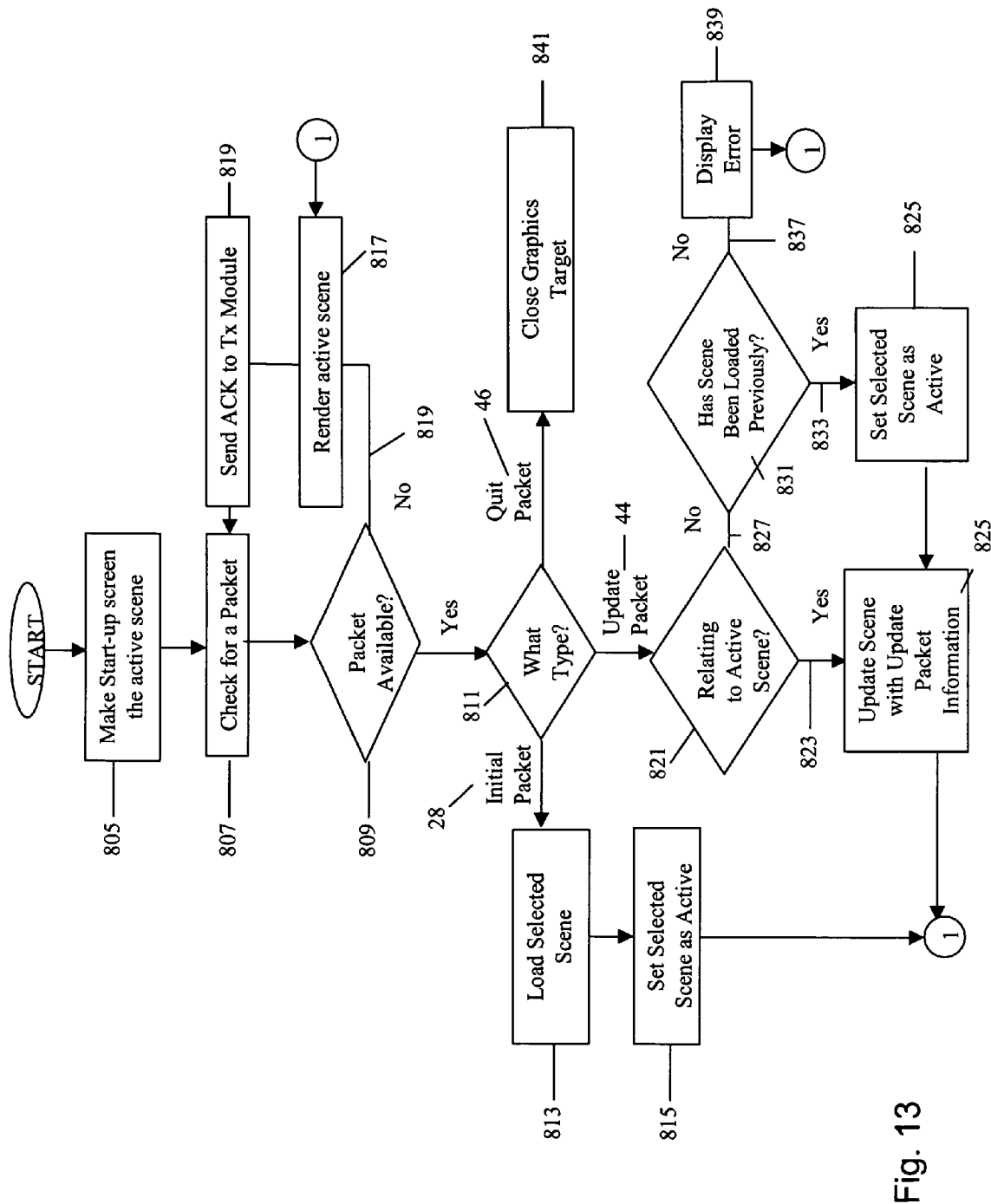
FIG. 13 is a flow diagram illustrating an embodiment of a process of the invention.

If the graphics target has any changes to be made to the 3D scene, it will send a custom data packet back to the haptic target indicating the changes to be made (FIG. 13). The haptic target always keeps control of the 3D scene. The haptic target will make all the changes and then send a confirmation data packet (i.e., an update data packet) to the graphics target to indicate that the changes have been accepted (FIG. 13).

The auxiliary software program (graphics target) preferably exists as a stand-alone Windows application. Preferably, when the program is started, it is put into a waiting state where it continually polls the UDP port for communication data that will come from either a haptic target or the development tool. When the graphics target receives a data packet from a haptic target, it loads the 3D scene that the graphics target will be referring to and displays the scene, preferably using an OpenGL rendering device. The loaded scene becomes the active scene. After the scene is loaded the graphics target sends a confirmation data packet back to the haptic target to confirm receipt.

Preferably, the graphics target can do one of three things. If it receives no other communication information then it will continue to render the active 3D scene. If it receives an update for the active scene from the previously connected haptic target or development tool, then the active scene is updated and the change is rendered on the screen. (If the update is for a scene which is inactive, then such scene becomes the active scene.) Lastly, if a new haptic target begins to communicate with the graphics target then the graphics target will load the new desired 3D scene and set it as the active scene to be rendered. When more then one haptic target is communicating with the graphics target then the graphics target manages which scene is active and renders it on the screen, as described above. That is, the most recent communication determines which scene is currently active. When changes to a scene occur and an update data packet is sent to the graphics target accordingly, then that scene becomes the active scene.

In the preferred embodiment, the process carried out by each graphics target is that which is illustrated in FIG. 13. At block 805, the graphics target makes the start-up screen the active screen. Next, and as indicated above, the graphics target continually polls the UDP port for communication data (block 807). If a packet is available (block 809), then the type of data packet is determined (block 810). As previously described, if the custom data packet which is available is the initial data packet 28 for a particular scene, the scene is loaded (block 813), and it is also set as the active scene (block 815).

Next, the active scene is rendered (block 817). An acknowledgement signal is sent, preferably to the transaction module which had transmitted the data packet 28 (block 819).

The graphics target then checks again for a data packet (block 807). If, after checking, no data packet is available, then the scene which was the active scene remains the active scene (step 819).

However, if a data packet is available and it is determined (in step 811) to be an update data packet 44, then the graphics target determines whether the update data packet 44 is related to the scene which is currently the active scene (block 821). If the update packet does relate to the current active scene (step 823), then the current active scene is updated with the update packet information (block 825).

However, if the update data packet 44 is not related to the current active scene (step 827), then the graphics target determines whether the scene to which the update data packet is related has been loaded previously (block 831). If the scene in question has been loaded previously (step 833), then such scene is set as the active scene (block 835), and the scene is then updated with the update data packet information (block 825).

However, if the scene to which the update data packet is related has not been loaded previously (step 837), then a display error results (block 839). The graphics target then returns to the current active scene, and renders the current active scene (block 817).

Once again, the graphics target checks for a data packet (block 807) and, if a packet is available (block 809), determines the type of data packet (block 811). If the data packet is the quit data packet 46, then the graphics target is closed (block 841).

The user has the ability to make changes to the scene from the graphics target end with the use of GUI sliders and buttons 54 (FIG. 7). When these GUI controls change state, the graphics target will send a custom data packet containing the changes back to the appropriate haptic target that owns the 3D scene.

The communication data packet embodies all of the activities in the haptic target(s)-to-graphics target(s) network(s). During the start-up phase of the haptic target, a data packet (i.e., the initial data packet 28) is constructed containing the information about the 3D scene (which file to load and where to find the file) and a list of all adjustable items in the scene that can be changed. The initialization data packet is constructed this way so that subsequent data packets from the haptic target can be minimized in size. If objects are known not to change in the scene then their state information does not need to be sent on following update commands because the default/initial state can be used when rendering.

The confirmation data packet (i.e., the acknowledgement) sent from the graphics target to the haptic target contains a unique identifier from the graphics target so that the haptic target can confirm that the correct graphics target received its signal.

Data packets (i.e., update data packets 44) sent from the haptic target to the graphics target that contain updated state changes contain the 3D scene filename and a listing of all the changed values. The 3D scene filename is used by the graphics target to identify which scene to update. If the filename is not recognized as one that was previously received from a haptic target then no changes are made. If the filename is valid then all the state values are updated in the 3D scene on the graphics target. Identifiers are not required to associate the changed state values with objects in the 3D scene since the graphics target already knows which items in the scene will be changed based on the initial communication data packet received from the haptic target. This optimization reduces the amount of data being sent across the network.

When a user wants to change objects in the 3D scene from the graphics target side using the GUI controls 54 (FIG. 7), a new data packet is constructed on the graphics target containing the filename of the active scene and the values of the changed states. The graphics target sends this data packet to the appropriate haptic target so that the haptic target can make the appropriate changes (block 121, FIG. 1C, and block 321, FIG. 2C). However, the haptic target also generates an update data packet (block 123, FIG. 1C and block 323, FIG. 2C) which is transmitted to the relevant graphics target(s) in order to update the corresponding graphical scene (blocks 127, FIG. 1C; and 327, FIG. 2C; and step 825, in FIG. 13).

Important aspects of the invention are the custom designed data packet and the communication logic handling between the scene owner and the scene displayer. The custom data packet contains key information that allows many-to-one and many-to-many network relationships to be formed in addition to the standard one-to-one and one-to-many relationships, in contrast to the prior art.

Also, in the invention, detailed 3D scenes can be rendered on the graphics targets without the need of dedicated high bandwidth networks. This is possible though the use of the custom data packet. Bidirectional communication between the scene owner and displayer is required to allow the displayer to control the owner (i.e., request changes to the scene), and represents a significant improvement over the prior art. Additions and/or subtractions of owners and/or displayers are relatively easy through the logic handling performed on both sides of the network. An easy to use graphical user interface allows the user to create communication networks between the scene owner(s) and displayer(s). The system is cross platform compatible, meaning that the scene owner and displayer do not need to reside on the same computer nor on the same operating system family. For example, a scene owner on a Windows computer can communicate to a scene displayer on a Linux computer.

In use, as shown in FIGS. 1A, 1B, and 1C, the haptic target 24 is generated using the development tool 22. The haptic target 24 haptically renders the scene as a virtual scene in which one or more parameters is adjustable. The graphics target 26 is also provided, for graphically rendering the scene. The initial data packet 28 (including a scene identifier and other data necessary for graphically rendering the scene, including an identification of the adjustable parameter(s)) is generated. The initial data packet is transmitted to the graphics target 26. Next, the graphics target 26 loads the initial data packet, thereby graphically rendering the scene as a graphical scene. Preferably, a first acknowledgement signal is then transmitted from the graphics target to confirm receipt of the initial data packet (block 117, FIG. 1B, and block 317, FIG. 2B).

If an adjustable parameter is to be updated, then the virtual scene is updated to include the updated adjustable parameter(s). Next, the update data packet is generated. The update data packet is transmitted to the graphics target. The relevant graphical scene is updated to include the updated adjustable parameters. A second acknowledgement is transmitted from the graphics target to confirm receipt of the update data packet.

If it is desired to close the graphics target, a quit data packet is generated. The quit data packet is transmitted to the graphics target. The graphics target is then closed.

Figure 8:
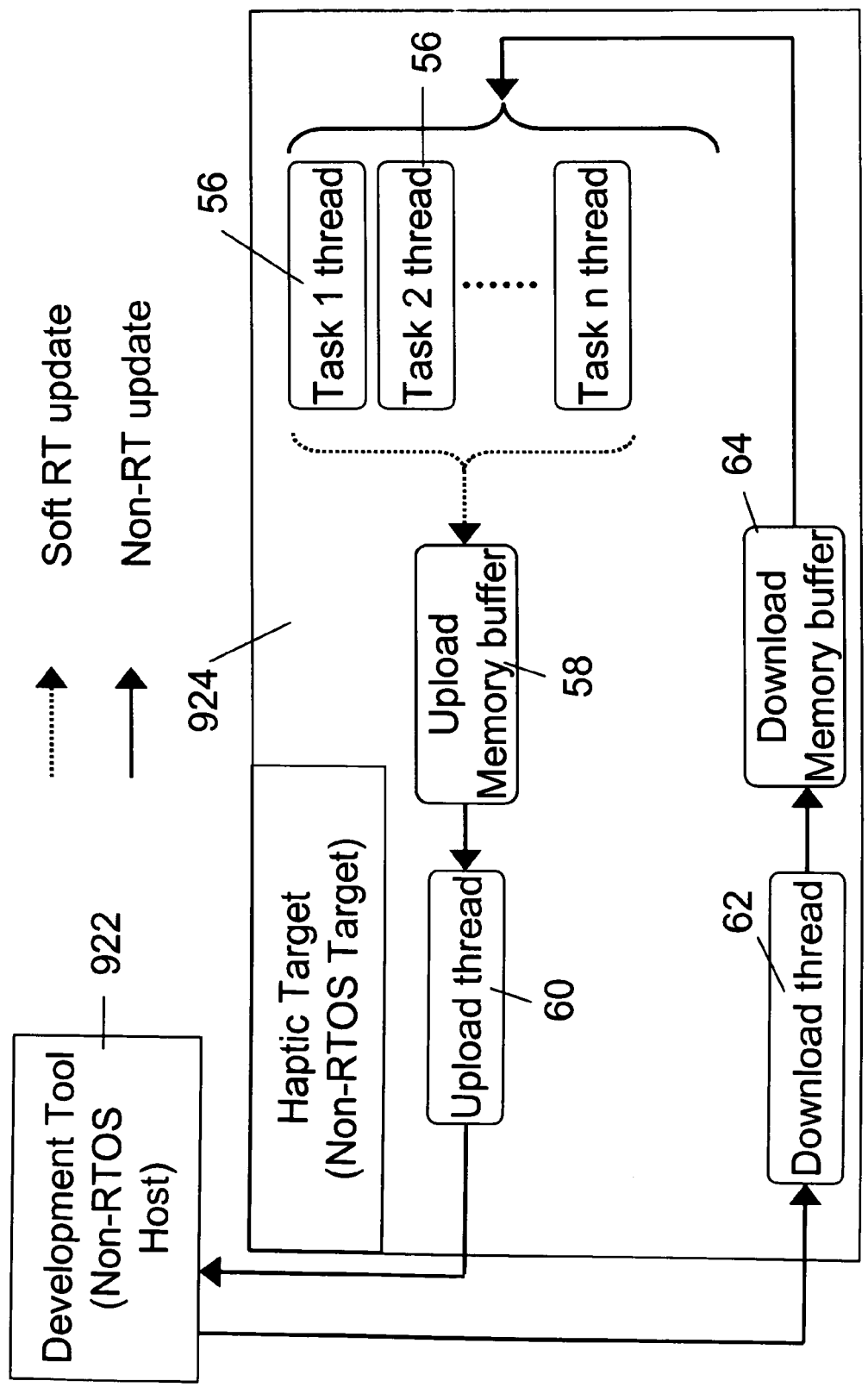
FIG. 8 is a software architecture diagram illustrating aspects of various software components utilized in an embodiment of the invention.
Figure 9A:
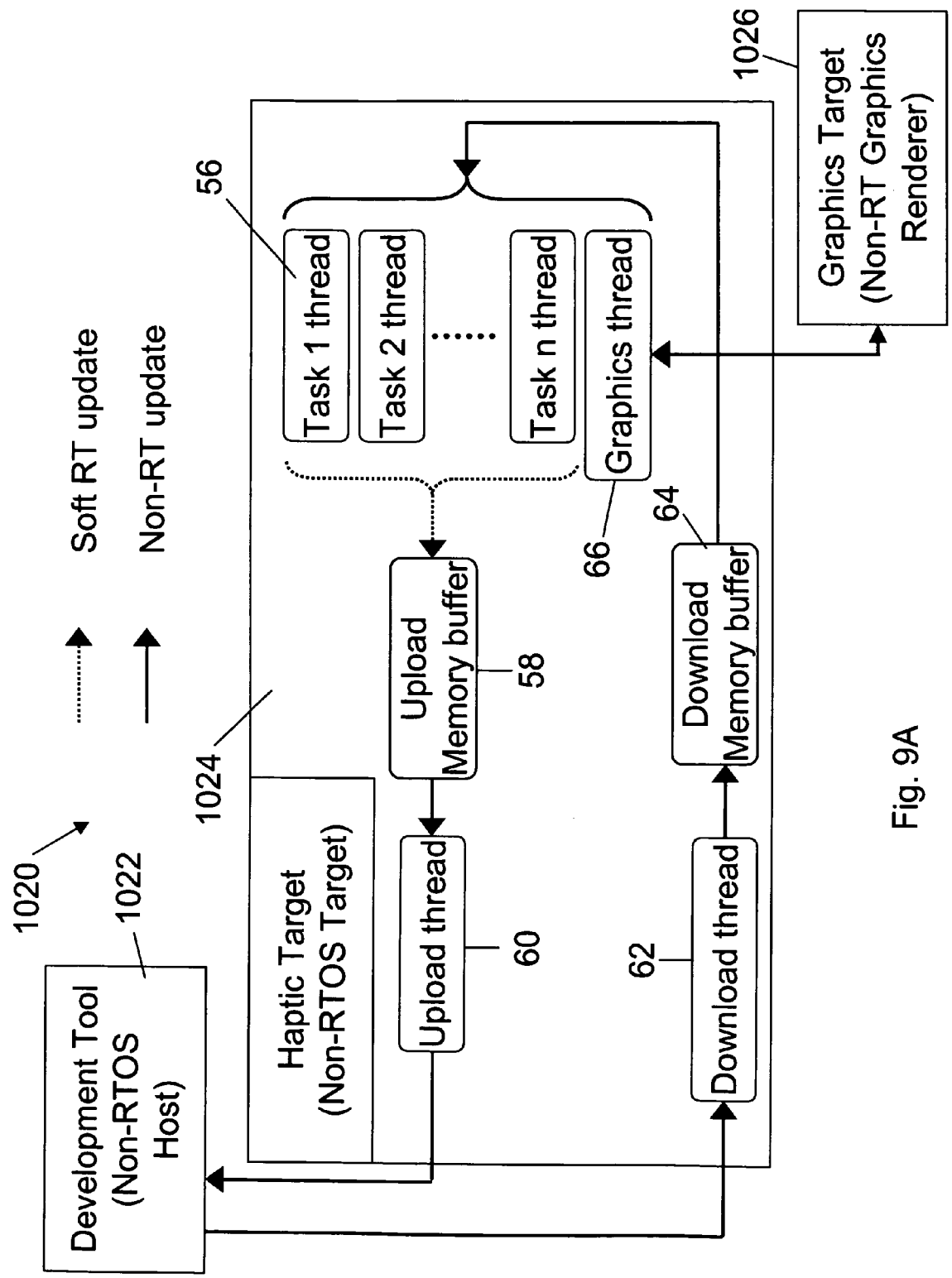
FIG. 9A is a software architecture diagram illustrating aspects of various software components utilized in an embodiment of the invention.

Referring to FIGS. 8 and 9A, an embodiment of the invention also allows applications developed by the development tool 22 to be run as soft real-time (soft-RT) applications without the use of a true real-time operating system (RTOS). As is known in the art, a RTOS is an operating system that guarantees accurate sample time. The execution time of any OS activities are bounded (i.e., the time it takes a certain task to be done is a known constant). RTOS also has the capability to allow developers to have exact control over the execution order of its processes and threads so that higher priority processes or threads will always get their tasks done before lower priority ones. Also, RTOS has a relatively high fault tolerance—i.e., RTOS is able to recover from threads getting hung up or terminated unexpectedly. (By "hung up" is meant temporarily halting progress of a thread.) On the other hand, non-RT essentially means that there are no guarantees about OS operation times, and priority of processes and threads can only be controlled to the best capability of the OS. However, an application developed for the non-RTOS can be run as a soft-RT application. A soft-RT application means that the application can run close to a RT application. There might be occasional times that the task execution time might exceed the allocated time but the effect of these misses is minimal to the overall system. For soft-RT application, processes and threads would tend to follow the order as specified by the developer, and only in rare cases does the non-RTOS intervene and raise the priority of some lower priority tasks to be higher, but again these cases are rare. Also, soft real-time is relatively robust because it is able to recover from threads getting hung up or terminated unexpectedly, i.e., soft real-time is relatively fault tolerant. The invention provides soft-RT applications running on a non-RTOS so that the applications can behave as closely to RT applications running on RTOS as possible.

The areas in which this technology can be used are those which, as in the system 20, require real-time capability for certain components of the system (e.g., the haptic rendering algorithm that calculates the force to be applied, or the network latency compensation), whereas some other parts of the system merely act as observatory or supervisory parts of the overall system (e.g., parameters updates).

In one embodiment of the invention, the work of the hapto-visual application is divided into one or more real-time sensitive parts and one or more non-real-time sensitive parts. The real-time sensitive parts of the system are processed within soft-RT threads that are given the highest priority in the non-RTOS. The non-real-time sensitive components are made to work only when the real-time components relinquish their time when their tasks are finished. This allows the applications to be able to execute the real-time sensitive components to the greatest accuracy, while the non-real-time sensitive components can also get their work done in complementing the real-time components.

By using the invention, it is possible to use any software development kit (SDK) that is developed for the main stream non-RTOS (including manufacturer's supplied drivers, which tend to have better control of the [haptic] device) in an application that runs at near real-time performance using main stream non-RTOS. This allows the application developers to be able to develop and test applications using the development tool 22 in much faster pace as well as having the ability to use the most up to date implementations of the supporting SDK. This also allows the developers to concentrate on developing the core algorithms that make the real-time applications work e.g., instead of concentrating their time re-writing third party SDKs so that the SDKs would work on the RTOS.

Because there is no special real-time kernel that must be running on the haptic target in the invention, no special licensing cost is needed for application deployment using the invention.

An example of the invention is provided in using the development tool to generate a soft-RT (haptic) target application that can run on a Windows environment computer (FIGS. 8, 9A). The main idea is to divide the soft-RT application into components that must be run in soft-RT and ones that can be run in non-real-time. Soft-RT components are the tasks that implement the algorithm designed using the development tool, whereas the non-real-time components are the parameters updating and the data monitoring of the real-time tasks.

FIG. 8 illustrates the basic structure of the soft real-time application as is generated by the toolbox. Each sample time is handled by a separate thread 56. All these threads 56 are specified to be soft real-time threads 56 in which they have priority over other processes on the same computer. Furthermore, these soft real-time threads 56 are organized so that threads with faster sample time have priority over threads with slower sample time. This ensures that the faster threads get run before the slower ones. All of the soft real-time threads 56 would update a memory pool ("Upload Memory Buffer" 58) that holds information about the data of all the blocks in the system. This update is done in soft real-time at a rate that is supplied by the development tool 922, as will be described. A separate upload thread 60 that runs continuously but at much lower priority than any of the real-time threads 56 would check the Upload Memory Buffer 58 to see if there is any data, and if so, will upload them to the development tool 922. This upload thread 60 is run totally separate from the real-time threads 58, so therefore would never hold up the execution of the soft real-time threads 56. This guarantees that the soft real-time threads 56 will be executed even if the upload thread 60 gets hung up for whatever reason (e.g. the development tool might be hung up by the user changing a block's parameters). For example, if the development tool failed to communicate for a certain time period, the haptic target would recognize this as a failure mode and take actions accordingly, such as stopping communicating data. Accordingly, the soft real-time application is relatively fault tolerant.

On the download side, the reverse situation happens. When a user changes the parameters of a certain block, the development tool 922 will send a message to the haptic target 924 to indicate a change of parameters has been done, along with the changed data. The haptic target 924 preferably has a download thread 62 that runs continuously which has a lower priority than any of the soft real-time threads 56 for the same reason that the upload thread 60 has lower priority than the soft real-time threads 56. The download thread 62 will get the message, interpret the message and update the memory pool ("Download Memory Buffer" 64) that holds all the parameters for the system. Preferably, at the start of each sample time, the soft real-time threads 56 look into the Download Memory Buffer 64 for the blocks parameters that they would need to perform the task. This approach ensures that the parameters used by the threads 56 would not get changed in the middle of the soft real-time threads' execution. Each soft real-time thread 56 only gets parameter values at the start of its sample time, and then use the same parameter throughout the execution step. Accordingly, the process described above ensures data consistency within an execution step.

Another aspect of the invention is the ability of the development tool 922 to communicate the time it takes to consume the data uploaded from the haptic target 924. The development tool 922 needs time to process the data sent from the haptic target 924, and to decide what to do with them (e.g., to render a VRML viewer using the uploaded data). This communication is important so that the soft real-time threads 56 on the haptic target 924 know they only need to pass information to the Upload Memory Buffer 58 fast enough for the development tool 922 to consume, instead of using up time to update the memory buffer 58 when the development tool 922 cannot even use the data. Another reason to match the upload rate and the time that the development tool 922 can consume the data is that there would not be any backlog of data in the development tool 922 because the upload thread 60 on the haptic target 924 would keep sending data as long as it sees that there is data in the Upload Memory Buffer 58. If there is no flow control, the development tool buffer (not shown) will get filled up with upload data and might corrupt the development tool 922.

Proper thread management is the key to ensure the multi-threaded soft real-time application runs at its full capability. Different thread synchronization techniques are used to ensure that all the threads are behaving properly. For example, in order to make sure the Upload thread would only send data when there is data in the Upload Memory Buffer 58, semaphores are used to hold up the upload thread 60 until the soft real-time threads 56 release it, indicating that data is available for upload. Critical sections are used to make sure messages sent between development tool 922 and haptic target 924 are intact so as to avoid problems when multiple threads are sending information on the same communication channel, and might corrupt the information from other threads.

An accurate way of generating a repeating clock signal is required for the accurate execution of the target application. In this embodiment, the Windows multimedia timer is used as the time source that can generate an accurate timing signal down to 1 millisecond (i.e. 1 kHz). This level of accuracy is acceptable for most haptic application which requires a 1 kHz sampling rate for good results. Other non-RTOS have similar timing services that can be used in generating accurate timing signals to drive the real-time application. No matter what OS is being used, the computer's internal crystal is used as the time source, however each crystal's frequency can be affected by temperature, thus will slowly drift from the actual time. One way to resynchronize the computer clock is by using Global Positioning System (GPS) to realign the clock signal used in the application. A block in the toolbox that can interface with GPS is used for this purpose.

Another embodiment of the invention, illustrated in FIG. 9A, is to create a separate graphics thread 66 that would feed information to an external graphics renderer (i.e., a graphics target 1026). The upload thread 60 is used to return data to a development tool 1022 so that it can display real-time data. However, the separate graphics target 1026 can be used to display some graphical intensive operation (e.g. to render 3D objects), and the graphics target 1026 can get data directly from a haptic target 1024 without going through the development tool 1022. This allows the application to be run without the development tool 1022 running, but at the same time allows data monitoring capability of the system 1020. A graphics thread 66 is run as non-real-time thread because the operation of the graphics target 1026 is not jeopardized if there are occasional missed data from the graphics thread 66. Also, if, for some reason, the graphics thread 66 gets hung up, it would not cause the other soft-real-time threads 56 to not function properly.

The ability to provide a soft real-time application to run on a non-RTOS can also be used in developing applications that require real-time execution but also require the use of other third-party SDKs. For example, real-time distributed computing, real-time image processing, and real-time network congestion control algorithm are some of the areas in which there are a vast majority of existing SDKs that researchers can make use of to improve on their own work. However many of the existing SDKs are only available for non-RTOS environments, thus limiting the ability of the researchers to use the SDKs in a real-time situation. By using the invention, it is therefore possible to develop soft real-time applications in the non-RTOS environment for which the third party SDKs were developed.

To help understand what type of information is passing between the non-real time host (i.e. the development tool), the non RTOS target (i.e. the haptic target) and the non-RT graphics renderer (i.e. the graphics target), an example is provided. Assuming that the development configuration shown in FIG. 5 is used, the application where the user is to interact with a virtual cube 50 using a haptic device is considered. The tip of the device is represented by a sphere 52 and the position of the sphere tracks the movements of the haptic device tip position (FIG. 7). When the sphere 52 collides with the cube 50, the user feels a force (via the haptic device) and the position of the cube 50 will change in a natural manner.

An example of communication between the development tool 1022 (or 922, as the case may be) and the haptic target 1024 (or 924) involves the parameter that defines the size of the cube 50. The parameter does not change as a function of the application, but the developer may wish to "tweak" (i.e., iteratively adjust one or more parameters) the size of the cube 50 to suit the application. When the size is changed, this information is passed to the haptic target 1024 (or 924) so that both haptic and graphic rendering can be performed appropriately.

An example of communication between the haptic target 1024 (or 924, as the case may be) and the development tool 1022 (or 922) is the force signals calculated to provide the appropriate force feedback. The developer would use this to debug and modify the algorithm used to calculate the force feedback. Note that this activity is only monitoring of signals and does not require real time reporting (namely, data can be stored in memory and later accessed in a non-real time manner).

An example of communication between the haptic target and the graphics target would be the position of the cube after it has been moved by the user. (This communication occurs in the development mode and in the deployment mode.)

An example of communication between the graphics target and the haptic target would be the mass and damping parameters that are read from the graphics target GUI (FIG. 7). (This communication occurs in the development mode and in the deployment mode.)

In summary, in one embodiment, the invention provides the ability to control the information flow between the non-real-time and soft real-time components without affecting the stable and robust execution of the soft real-time components.

The invention also provides the ability to make use of the non-RTOS services to allow proper threads execution priority. For example, the invention facilitates the use of semaphores and critical sections to serialize the order in which all the real-time threads execute as well as when the non-real-time threads can execute.

Also, in the invention, GPS is used to resynchronize the clock as to prevent time drifting due to imperfection in any computer clocks.

Figure 9B:
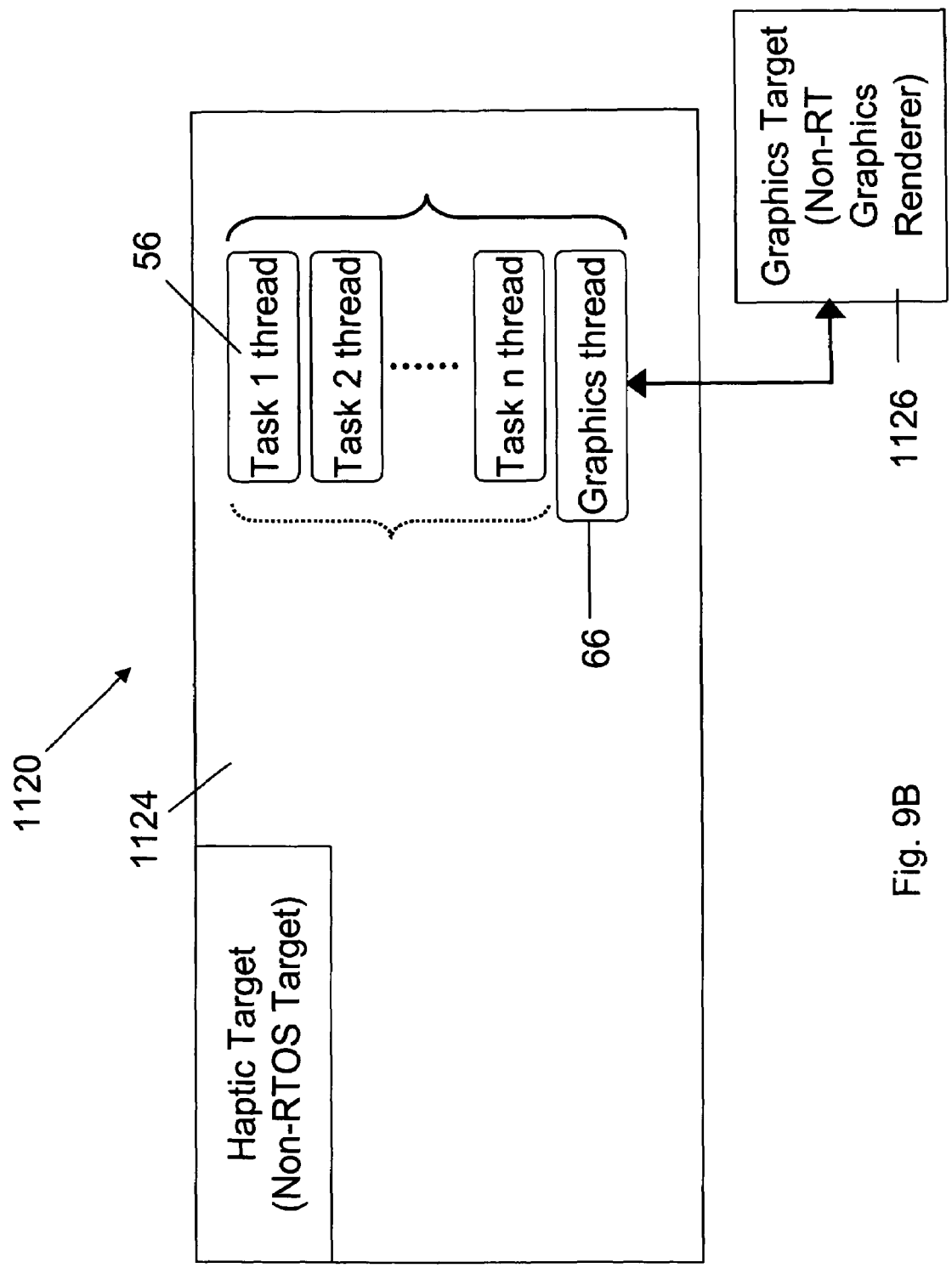
FIG. 9B is a software architecture diagram illustrating aspects of various software components utilized in an embodiment of the invention.

FIGS. 8 and 9A show how soft real-time threads and non-RTOS are utilized in the development configuration. FIG. 9B schematically illustrates the utilization of soft real-time threads and non-RTOS in the deployment configuration.

In FIG. 9B, a system 1120 includes a haptic target 1124 and a graphics target 1126. A change in the adjustable parameters can be requested by the user via the GUI on the graphics target 1126. The requested change is transmitted to the haptic target 1124. The requested change is processed within the graphic thread 66 (i.e., non-RTOS), and the requested change is communicated to the soft real-time threads of the haptic target for processing therein, i.e., if the requested change is for an adjustable parameter and otherwise acceptable.

Any element in a claim that does not explicitly state "means for" performing a specified function, or "step for" performing a specific function, is not to be interpreted as a "means" or a "step" clause as specified in 35 U.S.C. §112, paragraph 6. In particular, the use of "step of" in the claims herein is not intended to invoke the provisions of 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred version contained herein.

We claim:

1. A computer-usable medium having computer readable instructions stored thereon for execution by a processor to perform a method comprising:
   generating at least one haptic target for haptically rendering at least one scene as at least one virtual scene, said at least one scene having at least one adjustable parameter;
   haptically rendering said at least one scene as said at least one virtual scene;
   providing at least one graphics target for graphically rendering said at least one scene as at least one graphical scene;
   generating at least one initial data packet comprising an identifier of said at least one scene and identifying said at least one adjustable parameter;
   transmitting said at least one initial data packet to said at least one graphics target; and
   loading said at least one initial data packet on said at least one graphics target to create said at least one graphical scene, said at least one graphical scene comprising said at least one adjustable parameter.

2. A computer-usable medium according to claim 1 in which said method additionally comprises transmitting a first acknowledgement signal from said at least one graphics target for confirming receipt of said at least one initial data packet.

3. A computer-usable medium according to claim 1 in which said method additionally comprises:
   updating said at least one adjustable parameter to create at least one updated adjustable parameter;
   using said at least one updated adjustable parameter to update said at least one virtual scene;
   generating at least one update data packet comprising said at least one updated adjustable parameter; and
   updating said at least one graphical scene to include said at least one updated adjustable parameter.

4. A computer-usable medium according to claim 3 in which said method additionally comprises transmitting a second acknowledgement signal from said at least one graphics target for confirming receipt of said at least one update data packet.

5. A computer-usable medium according to claim 1 in which said method additionally comprises:
   using at least one soft real time process in haptically rendering said at least one scene; and using at least one non-real time process in graphically rendering said at least one scene.

6. A computer-usable medium according to claim 1 in which said method additionally comprises:
generating at least one quit data packet comprising instructions to close said at least one graphics target;
transmitting said at least one quit data packet to said at least one graphics target; and
closing said at least one graphics target.

7. A computer-usable medium according to claim 3 in which said method additionally comprises:
using said at least one graphics target to generate graphical data for updating said at least one adjustable parameter;
transmitting said graphical data to said at least one haptic target;
using said graphical data to update said at least one adjustable parameter, to create said at least one updated adjustable parameter;
using said at least one updated adjustable parameter to update said at least one virtual scene;
generating said at least one update data packet comprising said at least one updated adjustable parameter;
transmitting said at least one update data packet to said at least one graphics target; and
using said at least one updated adjustable parameter to update said at least one graphical scene.

8. A computer-usable medium according to claim 7 in which said method additionally comprises transmitting said second acknowledgement signal from said at least one graphics target for confirming receipt of said at least one update data packet.

9. A computer-usable medium according to claim 3 in which said method additionally comprises:
providing a haptic device for interfacing with a user in real space operatively connected to said at least one haptic target;
using the haptic device to generate haptic device data for updating said at least one adjustable parameter;
using said haptic device data to update said at least one adjustable parameter, to create said at least one updated adjustable parameter;
using said at least one updated adjustable parameter to update said at least one virtual scene;
generating said at least one update data packet comprising said at least one updated adjustable parameter;
transmitting said at least one update data packet to said at least one graphics target; and
using said at least one updated adjustable parameter to update said at least one graphical scene.

10. A computer-usable medium according to claim 1 in which said method comprises generating a plurality of haptic targets.

11. A computer-usable medium according to claim 1 in which said method comprises providing a plurality of graphics targets.

12. A computer-usable medium according to claim 1 in which said method comprises:
haptically rendering a plurality of scenes, each said scene being discretely haptically rendered as a discrete virtual scene; and
graphically rendering said plurality of scenes, each said scene being discretely graphically rendered as a discrete graphical scene corresponding to each said virtual scene.

13. A computer-usable medium according to claim 12 in which said method additionally comprises:
updating said at least one adjustable parameter for a preselected virtual scene to create at least one updated adjustable parameter therefor, said preselected virtual scene having a corresponding graphical scene;
using said at least one updated adjustable parameter to update said preselected virtual scene;
transmitting said at least one update data packet for said preselected virtual scene to said at least one graphics target;
if said preselected corresponding graphical scene is inactive, setting said corresponding graphical scene as active; and
updating said corresponding graphical scene to include said at least one updated adjustable parameter.

14. A computer-usable medium according to claim 12 in which said method additionally comprises:
updating said at least one adjustable parameter for a preselected virtual scene to create at least one updated adjustable parameter therefor, said preselected virtual scene having a corresponding graphical scene;
using said at least one updated adjustable parameter to update said preselected virtual scene;
transmitting said at least one update data packet for said preselected virtual scene to said at least one graphics target; and
if said preselected corresponding graphical scene is active, updating said corresponding graphical scene to include said at least one updated adjustable parameter.

15. A computer-usable medium having computer readable instructions stored thereon for execution by a processor to perform a method comprising:
generating at least one haptic target for haptically rendering a plurality of virtual scenes respectively;
discretely haptically rendering each said scene as each said virtual scene;
providing at least one graphics target for graphically rendering each said virtual scene as a corresponding graphical scene respectively;
generating an initial data packet for each said virtual scene respectively, each said initial data packet comprising an identifier of each said virtual scene respectively and at least one adjustable parameter in each said scene respectively;
transmitting each said initial data packet respectively to said at least one graphics target; and
loading each said initial data packet on said at least one graphics target to create each said corresponding graphical scene respectively, each said graphical scene comprising said at least one adjustable parameter respectively.

16. A computer-usable medium according to claim 15 in which said method additionally comprises:
upon loading each said graphical scene on said at least one graphics target respectively, sequentially setting each said graphical scene as active respectively, each said graphical scene being set as an inactive scene upon another graphical scene subsequently being set as active; and
discretely rendering each said active scene graphically.

17. A computer-usable medium according to claim 15 in which said method additionally comprises:
generating at least one quit data packet for said at least one graphics target, said at least one quit data packet comprising instructions to close said at least one graphics target;

transmitting said at least one quit data packet to said at least one graphics target; and closing said at least one graphics target.

18. A computer-usable medium according to claim 15 in which said method additionally comprises:

updating said at least one adjustable parameter for at least one preselected virtual scene to create at least one updated adjustable parameter for said at least one preselected virtual scene, said at least one preselected virtual scene having a corresponding graphical scene;

using said at least one updated adjustable parameter for said at least one preselected virtual scene to update said at least one preselected virtual scene;

generating at least one update data packet comprising said at least one updated adjustable parameter for updating said corresponding graphical scene;

transmitting said at least one update data packet to said at least one graphics target;

if said corresponding graphical scene is inactive, setting said corresponding graphical scene as active upon receipt of said at least one update data packet; and updating said corresponding graphical scene to include said at least one updated adjustable parameter.

19. A computer-usable medium according to claim 15 in which said method additionally comprises:

updating said at least one adjustable parameter for at least one preselected virtual scene to create at least one updated adjustable parameter for said at least one preselected virtual scene, said at least one preselected virtual scene having a corresponding graphical scene;

using said at least one updated adjustable parameter for said at least one preselected virtual scene to update said at least one preselected virtual scene;

generating at least one update data packet comprising said at least one updated adjustable parameter for updating said corresponding graphical scene;

transmitting said at least one update data packet to said at least one graphics target; and if said corresponding graphical scene is active, updating said corresponding graphical scene to include said at least one updated adjustable parameter.

20. A method of creating a system for haptically and graphically rendering at least one scene, the method comprising:

generating at least one haptic target for haptically rendering said at least one scene as at least one virtual scene;

haptically rendering said at least one scene as said at least one virtual scene;

providing at least one graphics target for graphically rendering said at least one scene as at least one graphical scene;

generating at least one initial data packet comprising an identifier of said at least one scene and at least one adjustable parameter in said at least one scene;

transmitting said at least one initial data packet to said at least one graphics target; and loading said at least one initial data packet on said at least one graphics target to create said at least one graphical scene, said at least one graphical scene comprising said at least one adjustable parameter.

21. A method according to claim 20 additionally comprising:

updating said at least one adjustable parameter to create at least one updated adjustable parameter;

using said at least one updated adjustable parameter to update said at least one virtual scene;

generating at least one update data packet comprising said at least one updated adjustable parameter;

transmitting said at least one update data packet to said at least one graphics target; and updating said at least one graphical scene to include said at least one updated adjustable parameter.

22. A method according to claim 20 additionally comprising:

generating at least one quit data packet comprising instructions to close said at least one graphics target;

transmitting said at least one quit data packet to said at least one graphics target; and closing said at least one graphics target.

23. A system for haptically and graphically rendering a plurality of scenes, the system comprising:

at least one haptic target for haptically rendering said scenes discretely as virtual scenes respectively utilizing at least one soft real time process;

at least one graphics target for graphically rendering said scenes discretely as graphical scenes respectively utilizing at least one non-real time process, each said graphical scene corresponding to each said virtual scene respectively;

means for generating a plurality of initial data packets, each said initial data packet being provided for each said virtual scene respectively, each said initial data packet comprising an identifier of each said scene respectively and at least one adjustable parameter in each said scene respectively;

means for transmitting said initial data packets sequentially to said at least one graphics target;

said at least one graphics target being adapted to load said initial data packets thereon sequentially to create each said graphical scene respectively, each said graphical scene corresponding to each said virtual scene respectively, each said graphical scene comprising said at least one adjustable parameter for each said corresponding virtual scene respectively.

24. A system according to claim 23 additionally comprising:

means for updating each said adjustable parameter to create at least one updated adjustable parameter for each said virtual scene respectively;

means for discretely updating each said virtual scene to include said at least one updated adjustable parameter for each said virtual scene respectively;

means for generating update data packets for each said virtual scene respectively, each said update data packet comprising said at least one updated adjustable parameter for each said virtual scene respectively;

means for transmitting each said update data packet respectively to said at least one graphics target; and means for discretely updating each said graphical scene to include said at least one updated adjustable parameter for each said graphical scene corresponding to each said virtual scene respectively.

25. A system according to claim 23 additionally comprising:

means for generating at least one quit data packet comprising instructions to close said at least one graphics target;

means for transmitting said at least one quit data packet to said at least one graphics target; and means for closing said at least one graphics target upon receipt thereby of said at least one quit data packet.

26. A computer-usable medium having computer readable instructions stored thereon for execution by a processor to perform a method comprising:

using at least one haptic target to haptically render at least one scene as at least one virtual scene utilizing at least one soft real time process;

generating at least one initial data packet comprising an identifier of said at least one scene and at least one adjustable parameter in said at least one virtual scene;

transmitting said at least one initial data packet to at least one graphics target adapted for graphically rendering said at least one virtual scene as at least one graphical scene; and using said at least one graphical target to graphically render said at least one scene as said at least one graphical scene utilizing a plurality of non-real time processes, said at least one graphical scene comprising said at least one adjustable parameter.

27. A computer-usable medium according to claim 26 in which said method additionally comprises:

updating said at least one adjustable parameter to create at least one updated adjustable parameter;

using said at least one updated adjustable parameter to update said at least one virtual scene;

generating at least one update data packet comprising said at least one updated adjustable parameter;

transmitting said at least one update data packet to said at least one graphics target; and updating said at least one graphical scene to include said at least one updated adjustable parameter.

28. A computer-usable medium according to claim 27 in which said method additionally comprises:

generating at least one quit data packet comprising instructions to close said at least one graphics target;

transmitting said at least one quit data packet to said at least one graphics target; and closing said at least one graphics target.

* * * * *